United States Patent
Oe et al.

(10) Patent No.: US 9,989,275 B2
(45) Date of Patent: Jun. 5, 2018

(54) REGISTER

(75) Inventors: Hiroyuki Oe, Toyota (JP); Yoko Ishiguro, Toyota (JP)

(73) Assignee: HOWA PLASTICS CO., LTD., Toyota-Shi, Aichi (JP)

( * ) Notice: Subject to any disclaimer, the term of this patent is extended or adjusted under 35 U.S.C. 154(b) by 375 days.

(21) Appl. No.: 14/356,235

(22) PCT Filed: Apr. 2, 2012

(86) PCT No.: PCT/JP2012/058906
§ 371 (c)(1),
(2), (4) Date: May 5, 2014

(87) PCT Pub. No.: WO2013/069316
PCT Pub. Date: May 16, 2013

(65) Prior Publication Data
US 2014/0308889 A1    Oct. 16, 2014

(30) Foreign Application Priority Data

Nov. 11, 2011 (JP) .................................. 2011-247601
Feb. 15, 2012 (JP) .................................. 2012-030593

(51) Int. Cl.
*F24F 13/08* (2006.01)
*F24F 13/14* (2006.01)
(Continued)

(52) U.S. Cl.
CPC ......... *F24F 13/1413* (2013.01); *B60H 1/345* (2013.01); *B60H 1/3421* (2013.01); *F24F 13/15* (2013.01)

(58) Field of Classification Search
CPC .......... F24F 13/08; F24F 13/082; F24F 13/14; F24F 13/1413; F24F 13/15
See application file for complete search history.

(56) References Cited

U.S. PATENT DOCUMENTS 4,840,113 A * 6/1989 Freitag ................. B60H 1/3421
454/155
2003/0211821 A1* 11/2003 Driller ..................... B60H 1/345
454/124
(Continued)

FOREIGN PATENT DOCUMENTS

DE    102006032587 A1    1/2008
DE    202010009031 U1    10/2010
(Continued)

OTHER PUBLICATIONS

China Patent Office, Chinese Search Report for Application No. 2012800550142, dated Aug. 19, 2015.
(Continued)

*Primary Examiner* — Nathaniel Herzfeld
(74) *Attorney, Agent, or Firm* — Lorenz & Kopf LLP

(57) ABSTRACT

A front movable louver is configured for one central horizontal fin axially supported to be turnable in the horizontal direction substantially at the up-down center inside an air outlet, while an upper auxiliary horizontal fin is axially supported so as to be storable and turnable in the horizontal direction in a storing recess provided on an upper wall surface inside the air outlet, and a lower auxiliary horizontal fin axially supported to be storable and turnable in the horizontal direction in a storing recess provided on a lower wall surface inside the air outlet. The central horizontal fin is axially supported to be turnable by pivots provided to project substantially at the centers of both sides. The upper auxiliary horizontal fin and the lower auxiliary horizontal fin are axially supported to be turnable in a manner of sticking out downstream-side end portions to a passage side.

9 Claims, 12 Drawing Sheets

(51) Int. Cl.
    *F24F 13/15*    (2006.01)
    *B60H 1/34*    (2006.01)

(56) References Cited

U.S. PATENT DOCUMENTS

| | | | | |
|---|---|---|---|---|
| 2007/0060040 A1* | 3/2007 | Ogura | ............ | B60H 1/3421 |
| | | | | 454/319 |
| 2008/0081550 A1* | 4/2008 | Shibata | ............ | B60H 1/3421 |
| | | | | 454/155 |
| 2010/0304655 A1* | 12/2010 | Nagasaka | ............ | F24F 13/06 |
| | | | | 454/152 |
| 2011/0045758 A1 | 2/2011 | Bastian | | |
| 2011/0237176 A1* | 9/2011 | Shibata | ............ | B60H 1/3428 |
| | | | | 454/330 |
| 2012/0009861 A1* | 1/2012 | Mercey | ............ | B60H 1/3421 |
| | | | | 454/162 |
| 2014/0302769 A1* | 10/2014 | Sawada | ............ | B60H 1/3421 |
| | | | | 454/315 |
| 2015/0174989 A1* | 6/2015 | Oe | ............ | B60H 1/34 |
| | | | | 454/152 |

FOREIGN PATENT DOCUMENTS

| | | |
|---|---|---|
| JP | S58184439 A | 10/1983 |
| JP | 2002103954 A | 4/2002 |
| JP | 2003039943 A | 2/2003 |
| JP | 2004210111 A | 7/2004 |
| JP | 3712930 B2 | 8/2005 |
| JP | 416521 B2 | 7/2008 |
| JP | 4165219 B2 | 8/2008 |
| JP | 2009160981 A | 7/2009 |
| JP | 2009241637 A | 10/2009 |
| JP | 2009241638 A | 10/2009 |
| JP | 2010105507 A | 5/2010 |
| JP | 2011251590 A | 12/2011 |

OTHER PUBLICATIONS

European Patent Office, German Extended Search Report for German Application No. 12848186.8-1756 / 2777966, dated Apr. 5, 2016.

Japanese Patent Office, Japanese Search Report for Japanese Patent Application No. PCT/JP2012/58906, filed Apr. 2, 2012.

* cited by examiner

REGISTER

CROSS-REFERENCE TO RELATED APPLICATION

This application is a U.S. National-Stage entry under 35 U.S.C. § 371 based on International Application No. PCT/JP2012/58906, filed Apr. 2, 2012, which claims priority to Japanese Patent Application No. 2011-247601, filed Nov. 11, 2011 and Japanese Patent Application No. 2012-030593, filed Feb. 15, 2012, which are all hereby incorporated in their entirety by reference.

TECHNICAL FIELD

The technical field relates to a register for air blow adjustment used for an air outlet for air conditioning of an automobile, etc., and specifically, to a register having a narrow and long air outlet that is long in the longitudinal direction and short in the shorter-side direction and inclined in the short-side direction.

BACKGROUND

Registers for air blow adjustment are used for air outlets for air conditioning of automobiles, etc. The registers have horizontally movable louvers and vertically movable louvers disposed one in front of the other in orthogonal directions inside bezels or retainers forming air passages. The louvers adjust an air blowing direction upward/downward and rightward/leftward by changing angles of fins of the horizontally movable louvers and the vertically movable louvers when blowing out air from the air outlets provided on the bezels. This configuration has been commonly used in air conditioners, etc., of automobiles.

As these types of registers, so-called thin registers each having a narrow and long rectangular-shaped air outlet that is long in the longitudinal direction and short in the shorter-side direction, and a small number of movable fins, approximately 1~3, are provided inside the air outlet and sometimes installed inside the cabins of automobiles mainly because of design ability or design demands (See, for example, JP2002-103954 A).

On the one side, the register used for air conditioning of an automobile is usually installed as opened in the front surface of the instrument panel, but in relation to a display, control panel, or the like to be installed thereon, the position of the thin register is sometimes arranged at the top of the instrument panel near the dashboard. In such a case that, for example, the register is arranged near the dashboard at the top of the instrument panel, the air outlet of the register is formed in an inclined shape with its upper portion retracted to the upstream side and its lower portion being projected to the downstream side so as to be in line with an inclined surface on the upper surface of the dashboard at the top of the instrument panel (See, for example, JP2004-210111 A).

Such a register has an air outlet that is rectangular and long in the longitudinal direction and short in the short-side direction and inclined in the short-side direction. Depending on the total design, the air outlet may have a great inclination in the front surface of the register, that is, a large inclination angle with respect to a vertical plane of the air outlet (i.e., a small inclination angle with respect to a horizontal plane).

However, in the register that is a thin register and has a great inclination of the front surface of the air outlet, there has been a problem that when the front fin is turned to the side of its inclination (to the downside), a lower air flow is blown out straight forward along a lower wall surface of the air outlet, and thus causes interference with an air flow heading obliquely downward, and accordingly, the directionality of wind during downward air blowing is likely to deteriorate. In addition, the larger the inclination angle with respect to a vertical plane of the front surface of the air outlet, the more the directionality of downward air blowing deteriorates.

In view of the foregoing, the embodiments has been made to solve the foregoing problems, and at least one object thereof is to provide a register, which has a narrow and long air outlet that is long in the longitudinal direction and short in the short-side direction and inclined in the short-side direction, capable of increasing the directionality of wind when a front movable louver is turned to the side of inclination of the air outlet. Furthermore, other objects, desirable features and characteristics will become apparent from the subsequent summary and detailed description, and the appended claims, taken in conjunction with the accompanying drawings and this background.

SUMMARY

A register according an embodiment is a register having a narrow and long air outlet that is long in a horizontal direction and short in an up-down vertical direction, and with a front movable louver being disposed along said horizontal direction in an inner front portion of said air outlet. The air outlet is inclined so as to retract an upper portion to an upstream side and project a lower portion to a downstream side, in which for the front movable louver, one central horizontal fin is axially supported so as to be turnable in said horizontal direction substantially at an up-down center inside the air outlet, while an upper auxiliary horizontal fin is axially supported so as to be storable and turnable in said horizontal direction in a storing recess provided on an upper wall surface inside said air outlet. In addition, a lower auxiliary horizontal fin is axially supported so as to be storable and turnable in the horizontal direction in a storing recess provided on a lower wall surface inside the air outlet. The central horizontal fin is axially supported so as to be turnable by pivots provided so as to project substantially at centers of both sides. The upper auxiliary horizontal fin and lower auxiliary horizontal fin are axially supported so as to be turnable in a manner of sticking out downstream-side end portions to a passage side, and when the central horizontal fin is turned to the downside, the lower auxiliary horizontal fin sticks out the downstream-side end portion toward the passage side and approximates the downstream-side end portion as if making said downstream-side end portion contact a lower surface of said central horizontal fin to block an air flow that passes through a section between the central horizontal fin and the lower auxiliary horizontal fin and proceeds straight ahead.

In addition, here, the "upstream side" and "downstream side" mean an upstream side or downstream side of an air flow flowing in the passage, and in each member, a front portion means a portion at the upstream side, and a rear portion means a portion at the downstream side. Also, "up," "down," "right," or "left" means up, down, right, or left in a front view of the air outlet of the register.

According to an embodiment, when the front movable louver is turned to the upside, the central horizontal fin is oriented obliquely upward and the upper auxiliary horizontal fin turns in a manner of sticking out its downstream-side end portion to the passage side to cause an action so as to push an air flow passing through an upper portion of the passage against the central horizontal fin side by the upper auxiliary horizontal fin. Thus the air flow pushed against an upper surface of the central horizontal fin can be satisfactorily guided by the central horizontal fin to be blown upward.

On the one hand, when the front movable louver is turned to the downside, because the central horizontal fin is oriented obliquely downward and the upper auxiliary horizontal fin and the lower auxiliary horizontal fin turn in a manner of sticking out the downstream-side end portions toward the passage side. Even in the thin register having a short up-down width, an air flow satisfactorily guided by the upper auxiliary horizontal fin and the central horizontal fin can be blown downward from the section between the fins, and at this time, because an air flow that passes through the lower side relative to the central horizontal fin and proceeds straight ahead is blocked by the lower auxiliary horizontal fin, the directionality of downward air blowing can be increased.

Here, it is preferable that the lower auxiliary horizontal fin of the front movable louver is arranged at a downstream-side position further than the upper auxiliary horizontal fin, and the front-rear position of pivots of said lower auxiliary horizontal fin is arranged substantially at the same position as that of the pivots of the central horizontal fin.

Further, a register of another embodiment is a register having a narrow and long, air outlet that is long in an up-down vertical direction and short in a horizontal direction. A front movable louver is disposed along the up-down vertical direction in an inner front portion of said air outlet. The air outlet is formed inclined so as to retract one side portion to an upstream side and project the other side portion to a downstream side. The front movable louver, one central vertical fin is axially supported so as to be turnable in the up-down vertical direction substantially at a right-left center inside said air outlet, while a retraction-side auxiliary vertical fin is axially supported so as to be storable and turnable in the up-down vertical direction in a storing recess provided on a retraction-side side wall surface inside said air outlet. A projection-side auxiliary vertical fin is axially supported so as to be storable and turnable in the up-down vertical direction in a storing recess provided on a projection-side side wall surface inside the air outlet. The central vertical fin is axially supported so as to be turnable by pivots at both sides provided so as to project substantially at right-left centers. The projection-side auxiliary vertical fin and the retraction-side auxiliary vertical fin are axially supported so as to be turnable in a manner of sticking out downstream-side end portions to a passage side, and when the central vertical fin is turned to the projection side of the air outlet, the projection-side auxiliary vertical fin sticks out the downstream-side end portion toward the passage side and approximates the downstream-side end portion as if making said downstream-side end portion contact a side surface of said central vertical fin to block an air flow that passes through a section between the central vertical fin and the projection-side auxiliary vertical fin and proceeds straight ahead.

According to an embodiment, when the front movable louver is turned to the retraction side in an obliquely right-left direction of the air outlet, the central vertical fin is oriented obliquely to the retraction side and the retraction-side auxiliary vertical fin turns in a manner of sticking out its downstream-side end portion to the passage side to cause an action so as to push an air flow passing through the retraction side of the passage against the central vertical fin side by the retraction-side auxiliary vertical fin. Thus the air flow pushed against a side surface of the central vertical fin and satisfactorily guided by the central vertical fin to be blown to the right or left side.

On the one hand, when the front movable louver is turned to the projection side in an obliquely right-left direction of the air outlet, because the central vertical fin is oriented to the projection side in the obliquely right-left direction and the projection-side auxiliary vertical fin and the retraction-side auxiliary vertical fin turn in a manner of sticking out the downstream-side end portions toward the passage side, even in the thin register having a short right-left width, an air flow satisfactorily guided by the retraction-side auxiliary vertical fin and the central vertical fin can be blown obliquely to the side from the section between the fins. At this time, because an air flow that passes through the projection side relative to the central vertical fin and proceeds straight ahead is blocked by the projection-side auxiliary vertical fin, the directionality of air blowing obliquely to the side can be increased.

Moreover, a register of another embodiment is a register having a narrow and long air outlet that is long in a horizontal direction and short in an up-down vertical direction, and with a front movable louver being disposed along the horizontal direction in an inner front portion of the air outlet. The air outlet is formed inclined so as to retract an upper portion to an upstream side and project a lower portion to a downstream side, in which for the front movable louver, one central horizontal fin is axially supported so as to be turnable in the horizontal direction substantially at an up-down center inside the air outlet, while an upper auxiliary horizontal fin is axially supported so as to be storable and turnable in the horizontal direction in a storing recess provided on an upper wall surface inside the air outlet. In addition, a lower auxiliary horizontal fin is axially supported so as to be storable and turnable in the horizontal direction in a storing recess provided on a lower wall surface inside said air outlet. The central horizontal fin is axially supported so as to be turnable by pivots provided at both sides of the downstream side, the upper auxiliary horizontal fin and lower auxiliary horizontal fin are axially supported so as to be turnable in a manner of sticking out downstream-side end portions to a passage side, and when said central horizontal fin is turned to the upside or downside, the upper auxiliary horizontal fin and the lower auxiliary horizontal fin stick out the downstream-side end portions toward the passage side, and the lower auxiliary horizontal fin or said upper auxiliary horizontal fin becomes parallel to said central horizontal fin and a front end portion of said lower auxiliary horizontal fin or said upper auxiliary horizontal fin approximates or contacts a rear end portion said central horizontal fin to function as one large-sized fin.

According to this embodiment, when the central horizontal fin is turned to the upside or downside, the upper auxiliary horizontal fin or the lower auxiliary horizontal fin becomes parallel to the central horizontal fin and the fins approximate each other to function as one large-sized fin. Thus the directionality of wind when the central horizontal fin is turned to the upside or downside can be increased.

In particular, when the central horizontal fin is turned to the downside, the upper auxiliary horizontal fin and the central horizontal fin function as one large-sized fin and the lower auxiliary horizontal fin sticking out to the passage side acts so as to push an air flow against a lower surface of the central horizontal fin, and thus even in the register which is a thin type and whose air outlet is inclined, the directionality of wind in the obliquely downward direction corresponding to the side of projection can be increased.

Moreover, because the pivots of the central horizontal fin are located at the downstream side, when the central horizontal fin is turned up or down, a part that appears at the front surface side to change is small, which makes the external appearance of the register excellent. Moreover, because the pivots of the central horizontal fin are located at the downstream side, an operation knob fitted slidably to the central horizontal fin can have a long forward projection length, and accordingly, the operability of the operation knob can be enhanced.

A register of another embodiment is a register having a narrow and long air outlet that is long in an up-down vertical direction and short in a horizontal direction, and with a front movable louver being disposed along said up-down vertical direction in an inner front portion of the air outlet, the air outlet being formed inclined so as to retract one side portion to an upstream side and project the other side portion to a downstream side, in which for the front movable louver, one central vertical fin is axially supported so as to be turnable in said up-down vertical direction substantially at a right-left center of the retraction side in said air outlet, while a retraction-side auxiliary vertical fin is axially supported so as to be storable and turnable in the up-down vertical direction in a storing recess provided on a retraction-side side wall surface inside said air outlet. In addition, a projection-side auxiliary vertical fin is axially supported so as to be storable and turnable in the up-down vertical direction in a storing recess provided on a projection-side wall surface in the air outlet. The central vertical fin is axially supported so as to be turnable by pivots provided at both sides of a downstream-side end portion. The retraction-side auxiliary vertical fin and projection-side auxiliary vertical fin are axially supported so as to be turnable in a manner of sticking out downstream-side end portions to a passage side, and when the central vertical fin is turned to the right or left, the retraction-side auxiliary vertical fin and the projection-side auxiliary vertical fin stick out the downstream-side end portions toward the passage side, and the projection-side auxiliary vertical fin or the retraction-side auxiliary vertical fin becomes parallel to central vertical fin and a front end portion of said projection-side auxiliary vertical fin or said retraction-side auxiliary vertical fin approximates or contacts near a rear end portion of the central vertical fin to function as one large-sized fin.

According to this embodiment, when the central vertical fin is turned to the right or left, the retraction-side auxiliary vertical fin or the projection-side auxiliary vertical fin becomes parallel to the central vertical fin and the fins approximate each other to function as one large-sized fin, and thus the directionality of wind when the central vertical fin is turned to the right or left can be increased.

In particular, when the central vertical fin is turned to the projection side of the air outlet, the retraction-side auxiliary vertical fin and the central vertical fin function as one large-sized fin and the projection-side auxiliary vertical fin sticking out to the passage side acts so as to push an air flow against a side surface of the central vertical fin. Thus, even when the register is a thin register and the air outlet is inclined is inclined in the short-side direction, the directionality of wind when the central vertical fin is turned to the projection side of the air outlet can be increased.

Moreover, because the pivots of the central vertical fin are located at the downstream side, when the central vertical fin is turned to the right or left, a part that appears at the front surface side to change is small, which makes the external appearance of the register excellent. Moreover, because the pivots of the central vertical fin are located at the downstream side, an operation knob fitted slidably to the central vertical fin can have a long forward projection length, and accordingly, the operability of the operation knob can be enhanced.

In addition, on an upstream side of the front movable louver, a rear movable louver with a large number of vertical fins or horizontal fins is provided side by side may be disposed turnably.

According to the register of an embodiment, even a register having a narrow and long air outlet that is long in the longitudinal direction and short in the short-side direction and inclined in the short-side direction can increase the directionality of wind when the front movable fin is turned to the side the air outlet.

BRIEF DESCRIPTION OF THE DRAWINGS

The present invention will hereinafter be described in conjunction with the following drawing figures, wherein like numerals denote like elements and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
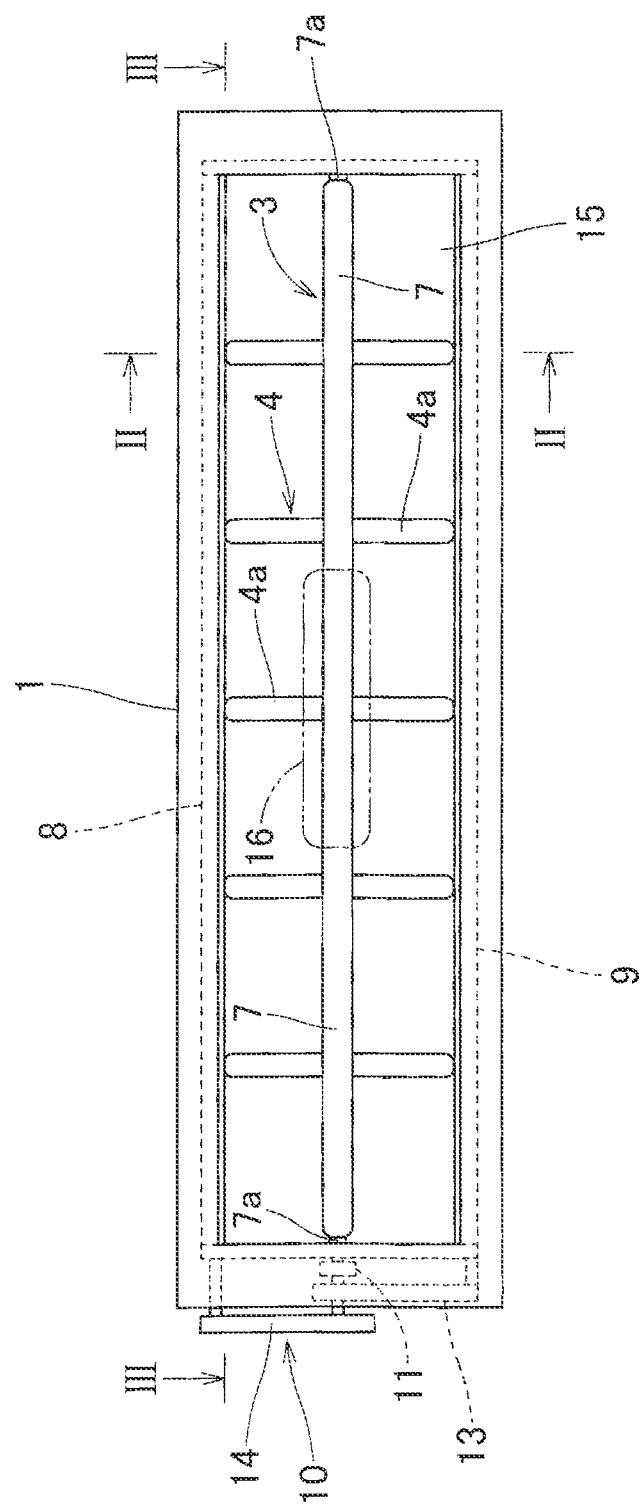
FIG. 1 is a front view of a register showing a first embodiment.
Figure 2:
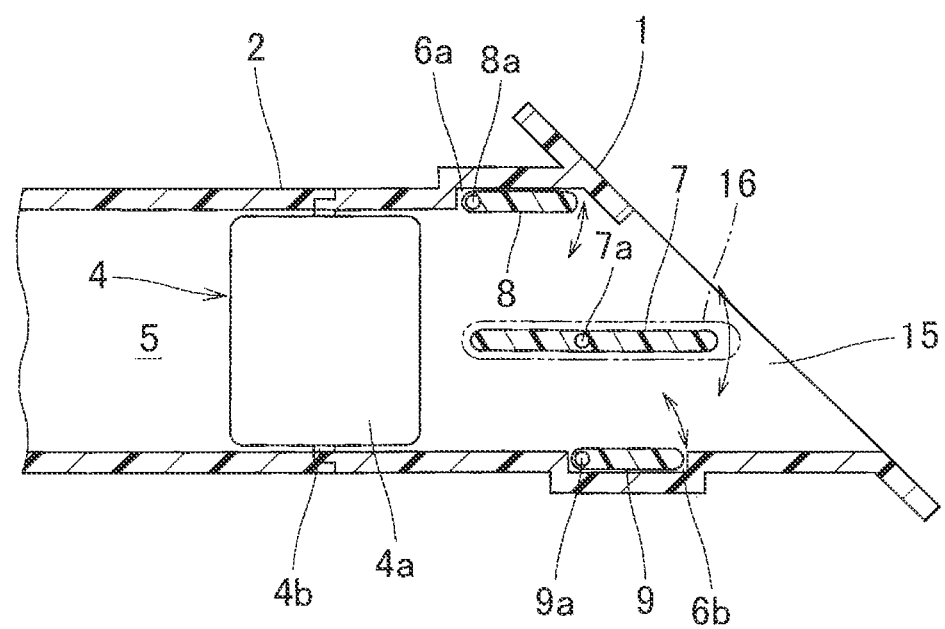
FIG. 2 is a sectional view along II-II of FIG. 1.

FIG. 1 to FIG. 6 show a register of a first embodiment, which is a thin register to be fitted to the instrument panel of an automobile. At the front surface of the register, a bezel 1 formed opening with a horizontally long rectangular air outlet 15 is attached, and the air outlet 15 is, as shown in FIG. 1, formed into a horizontally long rectangular shape, and is formed in a horizontally long rectangular that is long in the longitudinal direction (horizontal direction) and short in the short-side direction (up-down vertical direction). Moreover, the air outlet 15 in the front surface of the register is, as shown in FIG. 2, formed inclined in the short-side direction so as to retract its upper portion to the upstream side and project its lower portion to the downstream side. That is, the front surface of the air outlet 15 is inclined at an angle of approximately 45 degrees obliquely downward with respect to a horizontal plane in its short-side direction, and is in a so-called thin and slanted shape.

At the back surface side of the bezel 1, a fitting portion (not shown) for joining to a retainer 2 is provided, and a duct-like retainer 2 is fitted with and connected to the fitting portion. On right and left side walls inside of the air outlet 15 of the bezel 1, bearing portions for a front movable louver 3 are formed, and in the bearing portions provided on both sides, pivots 7a projecting at both end portions of a central horizontal fin 7 of the front movable louver 3 are supported, and similarly, pivots 8a projecting at both end portions of an upper auxiliary horizontal fin 8 and pivots 9a projecting at both sides of the lower auxiliary horizontal fin 9 are respectively supported, so that the central horizontal fin 7, the upper auxiliary horizontal fin 8, and the lower auxiliary horizontal fin 9 are turnable up and down in predetermined angular ranges.

Figure 3:
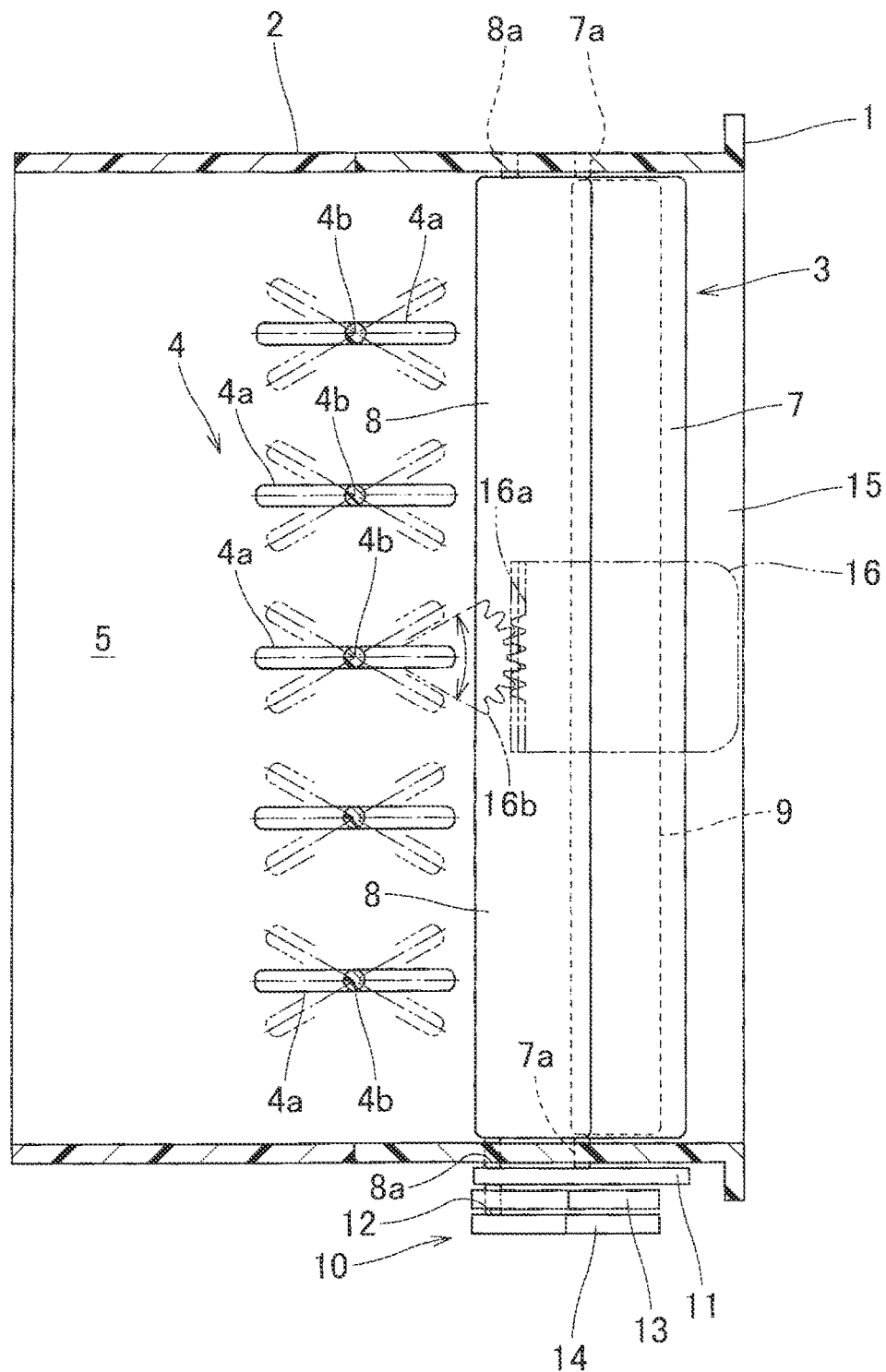
FIG. 3 is a sectional view along III-III of FIG. 1.

The retainer 2 is formed like a duct the cross-sectional shape of which is a horizontally long rectangular shape similar to that of the air outlet 15, and is formed inside with a passage 5 for ventilation. Bearing portions are formed at predetermined intervals on an upper wall and lower wall of a downstream-side edge portion of the retainer 2, and in those bearing portions, vertical fins 4a of a rear movable louver 4 are axially supported by pivots 4b as shown in FIG. 2 and FIG. 3, so that the respective vertical fins 4a turn to the right and left in conjunction with each other in a predetermined angular range. At a front portion of the retainer 2, the bezel 1 with a substantially rectangular air outlet 15 formed by opening in its front surface is fitted with its air outlet 15 aligned with the opening portion of the passage 5, and the passage 5 is formed communicating from the inside of the retainer 2 to the air outlet 15 of the bezel 1.

The front movable louver 3 includes one central horizontal fin 7 that is adjustable by turning upward and downward, an upper auxiliary horizontal fin 8 and a lower auxiliary horizontal fin 9 that are disposed at positions above and under the central horizontal fin 7 and turn up and down according to a turning operation of the central horizontal fin 7, and a fin turning mechanism 10 that turns the upper auxiliary horizontal fin 8 and the lower auxiliary horizontal fin 9 in conjunction with a turn of the central horizontal fin 7.

The central horizontal fin 7 has pivots 7a provided in a projecting manner at both ends, and as shown in FIG. 1 and FIG. 3, one pivot 7a penetrates through a side wall of the passage 5 to project to the outside, and a crank 11 is pivotally attached to the tip end of the pivot 7a. As shown in FIG. 2, the pivot 7a of the central horizontal fin 7 is located substantially at the center of the fin in a plan view, and the positions of the pivots 8a and 9a of the upper auxiliary horizontal fin 8 and the lower auxiliary horizontal fin 9 are located at downstream-side end portions of the respective fins in a plan view. Accordingly, when the central horizontal fin 7 is turned upward or downward, an upstream-side end portion and downstream-side end portion of the central horizontal fin 7 are substantially equally oriented upward or downward, and the upper auxiliary horizontal fin 8 and the lower auxiliary horizontal fin 9 are structured such that their downstream-side end portions stick out to the passage 5 side during turning.

As shown in FIG. 2, the upper auxiliary horizontal fin 8 is arranged adjacent to an upper wall surface in the passage 5, while a storing recess 6a is formed on the upper wall surface, and the upper auxiliary horizontal fin 8 is stored in a horizontal state inside the storing recess 6a. Moreover, the lower auxiliary horizontal fin 9 is arranged adjacent to a lower wall surface in the passage 5, while a storing recess 6b is formed on the lower wall surface, and the lower auxiliary horizontal fin 9 is stored in a horizontal state inside the storing recess 6b. The upper auxiliary horizontal fin 8 and the lower auxiliary horizontal fin 9 are formed with short widths in the front-rear direction, which are approximately ½ of the width in the front-rear direction of the central horizontal fin 7.

That is, the central horizontal fin 7 is formed long with a wide front-rear width, approximately two times the front-rear widths of the upper auxiliary horizontal fin 8 and the lower auxiliary horizontal fin 9, and further, the central horizontal fin 7 is in a mode such that, in a plan view thereof, its upstream-side half overlaps the upper auxiliary horizontal fin 8 and a downstream-side half of the central horizontal fin 7 overlaps the lower auxiliary horizontal fin 9. Thus, the upper auxiliary horizontal fin 8 and the lower auxiliary horizontal fin 9 are axially supported turnably, at the positions above or under the central horizontal fins 7, in a manner of sticking out their downstream-side edge portions in a horizontal state to the passage 5 side.

Figure 5:
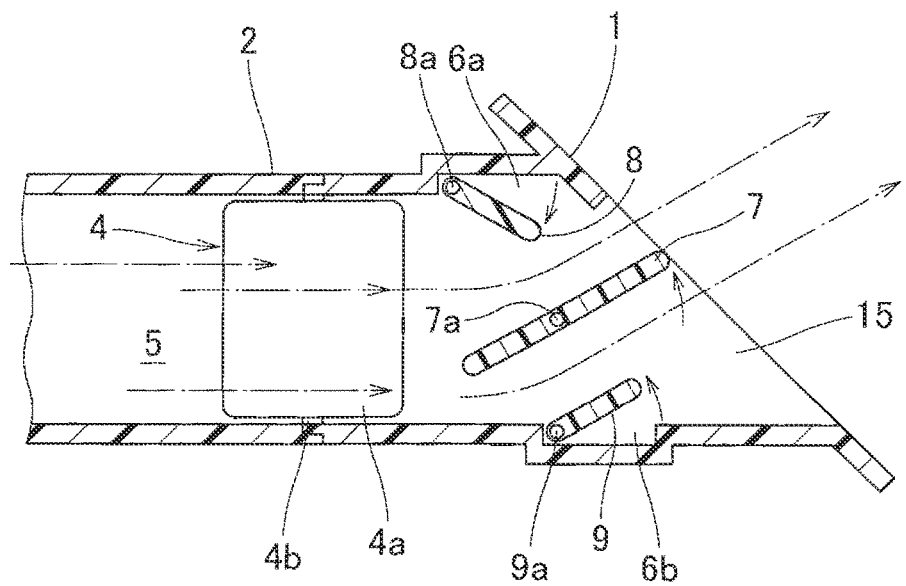
FIG. 5 is a sectional view when a front movable louver is turned up.
Figure 6:
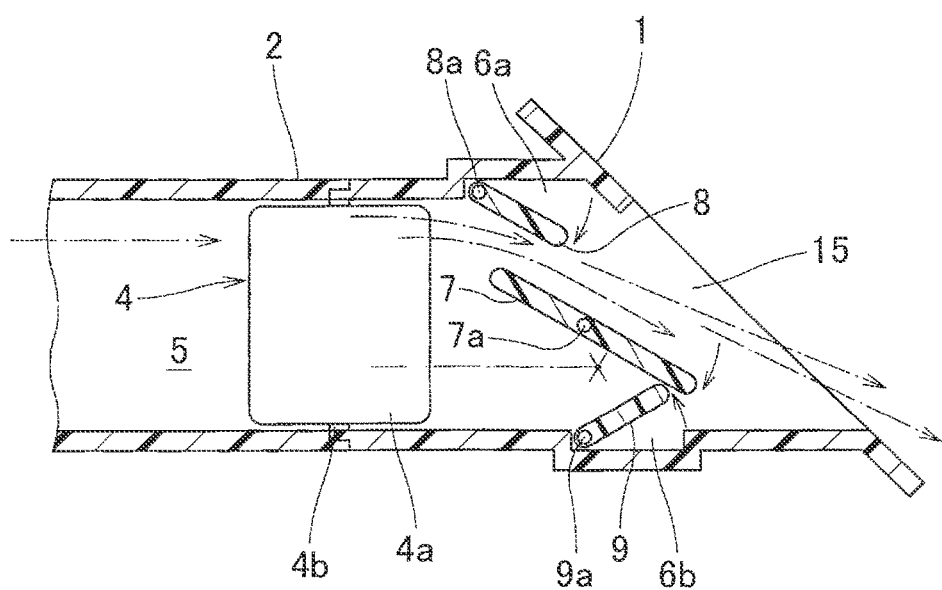
FIG. 6 is a sectional view when a front movable louver is turned down.

As shown in FIG. 5 and FIG. 6, the pivots 8a of the upper auxiliary horizontal fin 8 are provided so as to project at both sides near an upstream-side edge portion of the upper auxiliary horizontal fin 8, and the pivots 9a of the lower auxiliary horizontal fin 9 are provided so as to project at both sides near an upstream-side edge portion of the lower auxiliary horizontal fin 9, and as to their positions, the pivots 8a of the upper auxiliary horizontal fin 8 are located at upstream sides further than the pivots 7a of the central horizontal fin 7, and the position of the pivots 9a of the lower auxiliary horizontal fin 9 is substantially the same position as that of the pivots 7a of the central horizontal fin 7 in a plan view.

Accordingly, as shown in FIG. 5, when the central horizontal fin 7 is turned up to cause an upward turn and the lower auxiliary horizontal fin 9 is turned up to cause an upward turn, the central horizontal fin 7 and the lower auxiliary horizontal fin 9 become substantially parallel to each other, and as in FIG. 6, when the central horizontal fin 7 is turned downward and the upper auxiliary horizontal fin 8 is turned downward, the central horizontal fin 7 and the upper auxiliary horizontal fin 8 operate so as to become substantially parallel to each other.

A fin turning mechanism 10 is provided outside a left side surface of the bezel 1 in order to cause a conjunctive operation as in the above for the upper auxiliary horizontal fin 8 and the lower auxiliary horizontal fin 9 when the central horizontal fin 7 is turned upward or downward as described above. The fin turning mechanism 10 is composed of the crank 11 pivotally attached to the pivot 7a of the central horizontal fin 7 in the foregoing, a first cam member 13 pivotally attached to the pivot 8a of the upper auxiliary horizontal fin 8, and a second cam member 14 pivotally attached to the pivot 9a of the lower auxiliary horizontal fin 9.

Figure 4:
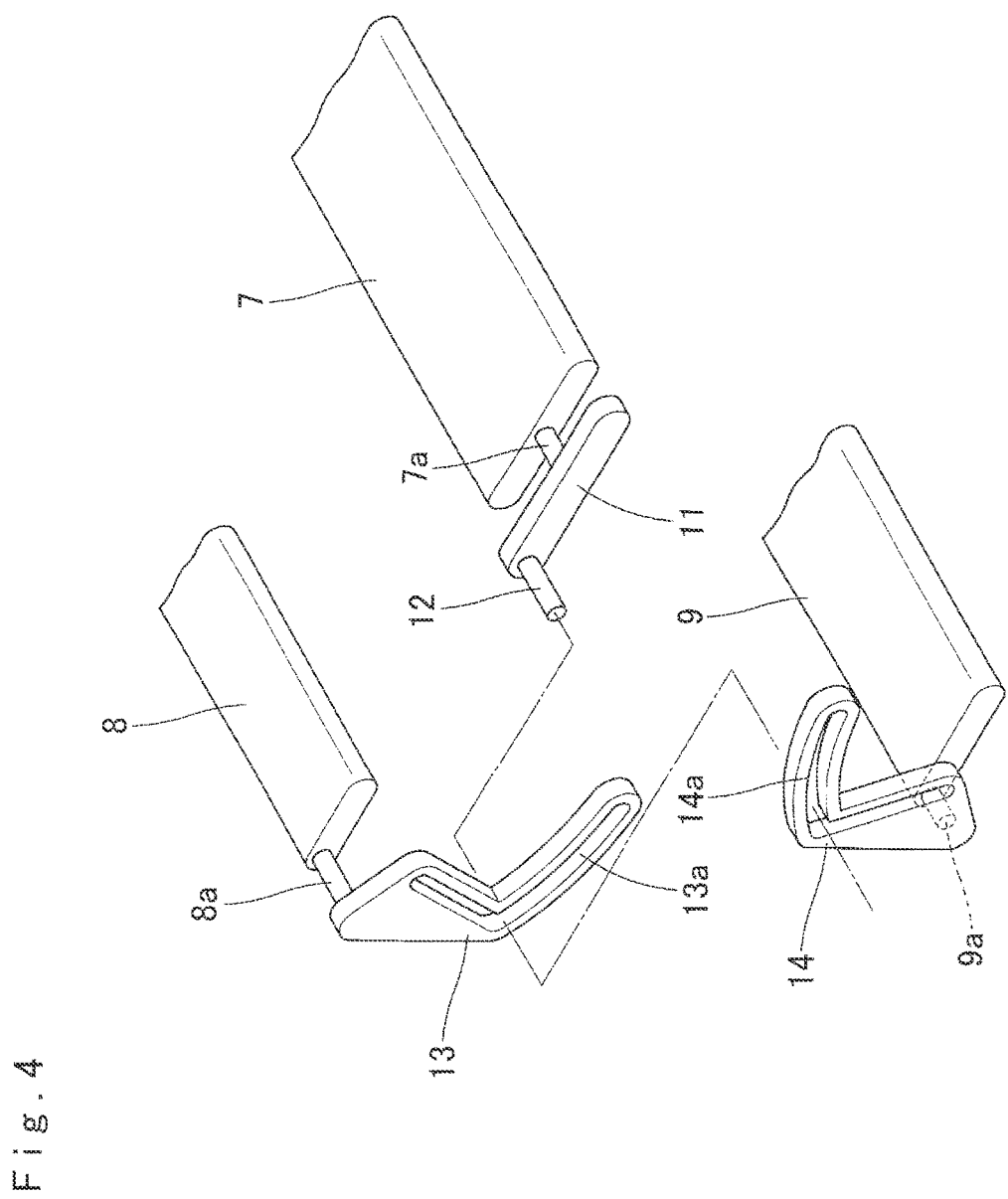
FIG. 4 is a perspective view showing a fin turning mechanism.

In the first cam member 13, as shown in FIG. 4, a long hole-like cam groove 13a bent in a substantially laid V-shape is formed, and a similar cam groove 14a is formed in the second cam member 14. These cam grooves 13a and 14a are formed as through-holes. Further, as shown in FIG. 4, at a tip end portion of the crank 11 pivotally attached to the pivot 7a of the central horizontal fin 7, a crankshaft 12 is provided in a projecting manner, and the crankshaft 12 is inserted into both of the cam groove 13a of the first cam member 13 and the cam groove 14a of the second cam member 14 to be assembled.

The upper auxiliary horizontal fin 8 and the lower auxiliary horizontal fin 9 that turn in conjunction due to an operation of the fin turning mechanism 10, have a horizontal posture to reach a state stored in the storing recesses 6a and 6b, respectively, due to an action of the crank 11, the first cam member 13, and the second cam member 14 when the central horizontal fin 7 is oriented straight forward to set the direction in the up-down direction thereof to the horizontal direction as in FIG. 2. Moreover, when the central horizontal fin 7 is turned to the upside as in FIG. 5, that is, when the direction of the central horizontal fin 7 is turned upward, the direction of the lower auxiliary horizontal fin 9 similarly turns to the upside, and the direction of the upper auxiliary horizontal fin 8 turns to the downside. On the one hand, when the central horizontal fin 7 is turned to the downside as in FIG. 6, that is, when the direction of the central horizontal fin 7 is turned downward, the direction of the upper auxiliary horizontal fin 8 similarly turns to the downside, and the direction of the lower auxiliary horizontal fin 9 turns to the upside. That is, the upper auxiliary horizontal fin 8 and the lower auxiliary horizontal fin 9 are structured so as to turn in a manner of sticking out their downstream-side edge portions into the passage 5 in either case where the direction of the central horizontal fin 7 is turned upward or downward.

A rear movable louver 4 is disposed in the passage 5 and upstream from the front movable louver 3. In the rear movable louver 4, a plurality of vertical fins 4a are provided vertically side by side at fixed intervals left horizontally. Each vertical fin 4a has pivots 4b provided so as to project at an upper portion and lower portion, and the upper and lower pivots 4b are axially supported by bearing portions provided on the upper wall and lower wall of the passage 5, and supported so as to be turnable rightward and leftward.

On the above-described central horizontal fin 7, as shown in FIG. 1, an operation knob 16 is externally fitted so as to be slidable in the right-left longitudinal direction to provide a structure for grasping the operation knob 16 to make the central horizontal fin 7 turnable in the up-down direction and turning the rear movable louver 4 to the right or left to change the wind direction to the right or left by sliding the operation knob 16 in the right-left direction.

Therefore, as shown in FIG. 3, a rack portion 16a is provided at a rear portion of the operation knob 16 as a linkage portion, a fan-shaped gear portion 16b is provided on one vertical fin 4a of the rear movable louver 4, the rack portion 16a and the gear portion 16b engage with each other, and when the operation knob 16 is operated to slide, the vertical fin 4a turns. Moreover, at the pivots 4b of all vertical fins 4a including that vertical fin 4a, cranks (not shown) are pivotally attached, and crankshafts of the respective cranks are mutually joined by one link bar. Accordingly, a structure is provided in that, when the operation knob 16 is slid to the right or left on the central horizontal fin 7, the respective vertical fins 4a of the rear movable louver 4 turn to the right or left in conjunction so as to adjust the wind direction to the right or left.

Next, the operation of the register configured as described above will be described based on FIG. 2, FIG. 5, and FIG. 6. The register is fitted, to the part of the instrument panel or dashboard inside the cabin of an automobile, by connecting an air inlet at the back surface side to an air duct (not shown). The air outlet 15 of the register is exposed to the front surface of the instrument panel or dashboard, but is inclined such that an upper portion of the air outlet 15 retracts to the upstream side and a lower portion thereof projects to the downstream side, and can thus match in design with the inclination shape of the instrument panel or dashboard, and moreover, because the air outlet 15 of the thin register is very narrow and long and designed simple, the design of its front surface can be satisfactorily matched in design with a display or control panel provided on the instrument panel or dashboard.

When air is blown straight in front of the register, as in FIG. 2, the central horizontal fin 7 of the front movable louver 3 is brought into a horizontal state, that is, a state oriented straight ahead. In this state, the upper auxiliary horizontal fin 8 and the lower auxiliary horizontal fin 9 both keep a horizontal state and are stored inside the storing recesses 6a and 6b on the upper wall surface and lower wall surface of the passage 5. Consequently, an air flow flowing in the passage 5 is, with little air resistance received due to the upper auxiliary horizontal fin 8 and the lower auxiliary horizontal fin 9, blown in the horizontal forward direction to which the central horizontal fin 7 is oriented with very small pressure loss. Thus, as compared with a normal register for which three horizontal fins are provided side by side at the air outlet, pressure loss during a horizontal adjustment can be reduced.

On the one hand, where the central horizontal fin 7 is in a horizontal state as described above, when the operation knob 16 is operated to turn the central horizontal fin 7 upward as in FIG. 5, the upper auxiliary horizontal fin 8 and the lower auxiliary horizontal fin 9 turn in a manner of sticking out their downstream-side end portions to the inside of the passage 5 due to an operation of the crank 11, the first cam member 13, and the second cam member 14 of the fin turning mechanism 10, and the upper auxiliary horizontal fin 8 turns to be oriented obliquely downward, and the lower auxiliary horizontal fin 9 turns to be oriented obliquely upward.

Thus, an air flow flowing from the passage 5 toward the air outlet 15 is, as shown in FIG. 5, gathered near the up-down center of the passage 5 by the upper auxiliary horizontal fin 8 and the lower auxiliary horizontal fin 9, and particularly, an air flow flowing in an upper portion of the passage 5 gathers near the central horizontal fin 7 due to the upper auxiliary horizontal fin 8 oriented obliquely downward, and the air flow gathered near the central horizontal fin 7 flows along the central horizontal fin 7, and is blown obliquely upward to which the central horizontal fin 7 is oriented.

Moreover, as in FIG. 5, because the lower auxiliary horizontal fin 9 is oriented obliquely upward which is the same in direction as the central horizontal fin 7, an air flow passing through the section between the central horizontal fin 7 and the lower auxiliary horizontal fin 9 can be efficiently blown obliquely upward, and moreover, because the lower auxiliary horizontal fin 9 is oriented obliquely upward in a manner of sticking out upward from the storing recess 6b, virtually no air flow that flows straight forward in a clearance with the lower wall surface occurs.

Similarly, the upper auxiliary horizontal fin 8 operates so as to turn downward relative to the storing recess 6a in a manner of sticking out its downstream-side end portion to the inside of the passage 5 to gather an air flow flowing in the passage 5 near the periphery of the central horizontal fin 7, and thus generates an air flow along the central horizontal fin 7, and virtually no air flow that flows straight forward in a clearance between the upper wall surface of the passage 5 and the upper auxiliary horizontal fin 8 occurs.

Therefore, an air flow flowing along the central horizontal fin 7 is not disturbed as in a normal register for which three horizontal fins are provided, and flows smoothly, and directionality when the central horizontal fin 7 of the front movable louver 3 is turned up can be greatly increased.

On the other hand, where the central horizontal fin 7 is in a horizontal state, when the operation knob 16 is operated to turn the central horizontal fin 7 downward as in FIG. 6, similar to the above, the upper auxiliary horizontal fin 8 and the lower auxiliary horizontal fin 9 turn in a manner of sticking out their downstream-side end portions to the inside of the passage 5 due to an operation of the crank 11, the first cam member 13, and the second cam member 14 of the fin turning mechanism 10, and the upper auxiliary horizontal fin 8 turns to be oriented obliquely downward together with the central horizontal fin 7, and the lower auxiliary horizontal fin 9 turns to be oriented obliquely upward.

Thus, an air flow flowing from the passage 5 toward the air outlet 15, particularly, an air flow flowing in an upper portion of the passage 5 is guided to the inside by the upper auxiliary horizontal fin 8 to gather at the central horizontal fin 7 side, and flows along the central horizontal fin 7, passes through the section between the upper auxiliary horizontal fin 8 and the central horizontal fin 7, and is blown obliquely downward to which the central horizontal fin 7 is oriented.

At this time, as in FIG. 6, because the upper auxiliary horizontal fin 8 reaches a state sticking out obliquely downward from the storing recess 6a to the passage 5 side, virtually no air flow that flows straight forward in a clearance between the upper wall surface of the passage 5 and the upper auxiliary horizontal fin 8 occurs, and an air flow is satisfactorily guided obliquely downward by the central horizontal fin 7, and blown.

On the one hand, the lower auxiliary horizontal fin 9 operates so as to turn upward in a manner of sticking out its downstream-side end portion to the inside of the passage 5 to approximate the tip end of the fin as if making it contact a lower surface of the central horizontal fin 7. Thus, as in FIG. 6, an air flow that flows straight forward near the lower wall surface of the passage 5 and the lower auxiliary horizontal fin 9 is blocked, which does not exert influence such as disturbing an air flow blown downward along the central horizontal fin 7.

Therefore, similar to the above, also when the central horizontal fin 7 is turned downward, an air flow flowing along the central horizontal fin 7 flows satisfactorily without being disturbed as in a normal register for which three horizontal fins are provided, and even in the register having the air outlet 15 inclined to the downside, the directionality of wind when the central horizontal fin 7 of the front movable louver 3 is turned down can be greatly increased.

In this manner, when the front movable louver 3 is turned to the upside, the central horizontal fin 7 is oriented obliquely upward and the upper auxiliary horizontal fin 8 turns in a manner of sticking out its downstream-side end portion to the passage 5 side to cause an action so as to push an air flow passing through an upper portion of the passage 5 against the central horizontal fin 7 side by the upper auxiliary horizontal fin 8, and thus the air flow pushed against an upper surface of the central horizontal fin 7 can be satisfactorily guided by the central horizontal fin 7 to be blown upward.

Moreover, when the front movable louver 3 is turned to the downside, because the central horizontal fin 7 is oriented obliquely downward and the upper auxiliary horizontal fin 8 and the lower auxiliary horizontal fin 9 turn in a manner of sticking out the downstream-side end portions toward the passage 5 side, an air flow satisfactorily guided by the upper auxiliary horizontal fin 8 and the central horizontal fin 7 can be blown downward from the section between the fins, and at this time, because an air flow that passes through the lower side relative to the central horizontal fin 7 and proceeds straight ahead is blocked by the lower auxiliary horizontal fin 9, even in the register having the air outlet 15 inclined to the downside, the directionality of obliquely downward air blowing can be increased.

On the one side, when the wind direction is changed to the right or left, the operation knob 16 on the central horizontal fin 7 is operated to slide to change the direction of the vertical fins 4a of the rear movable louver 4 to the right or left. Thus, the respective vertical fins 4a of the rear movable louver 4 turn to the right or left to change their direction, and the direction of wind to be blown from the air outlet 15 is adjusted to the right or left.

Figure 7:
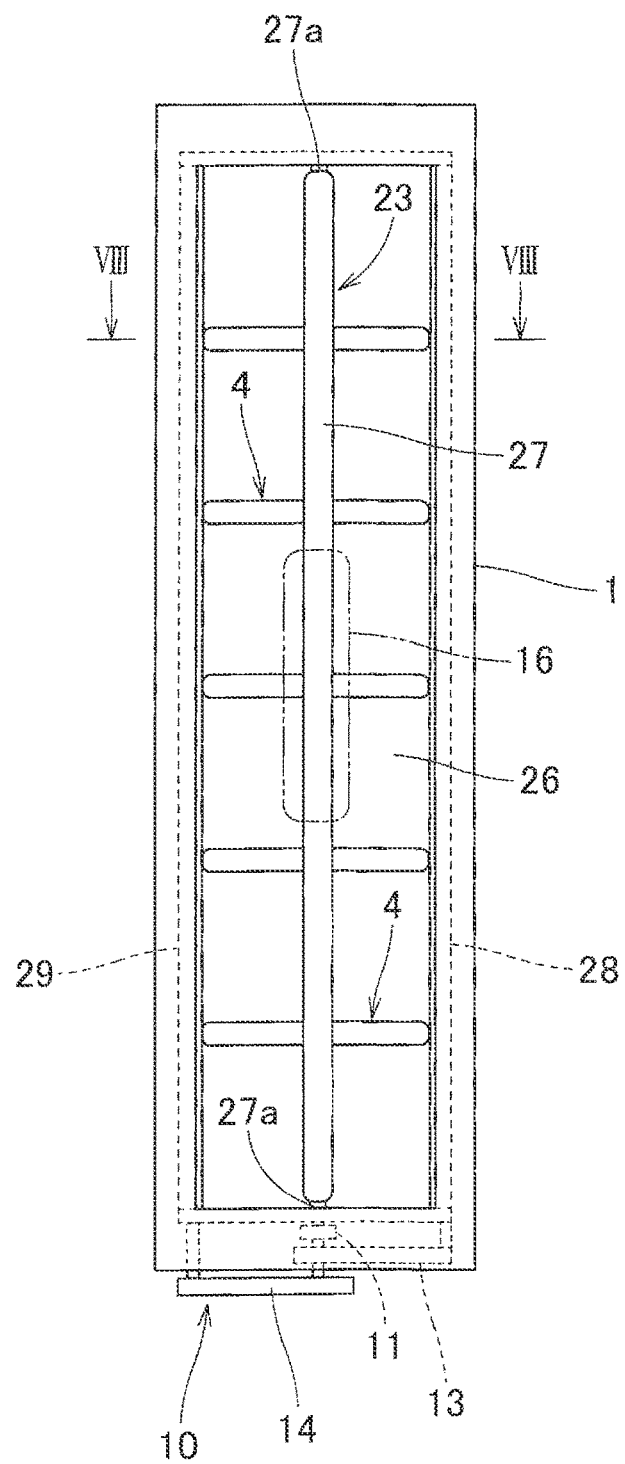
FIG. 7 is a front view of a register of a second embodiment.
Figure 8:
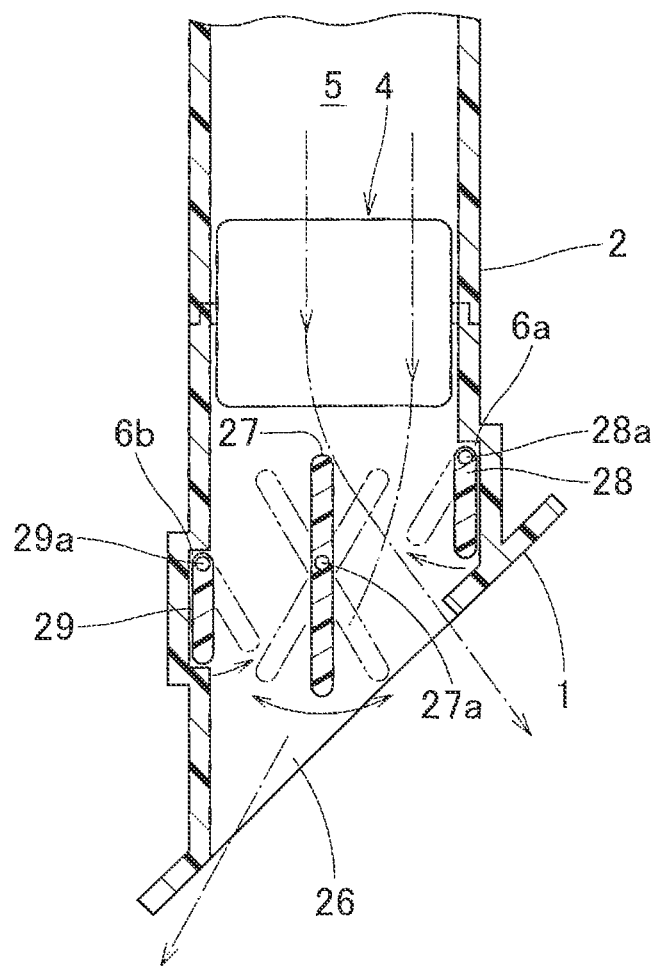
FIG. 8 is a sectional view along VIII-VIII of the register in FIG. 7.

FIG. 7 and FIG. 8 show a register of the second embodiment. This register is, as shown in the same Figs., as its front surface shape, in a shape of the register of the first embodiment described above turned over 90 degrees, and has a rectangular air outlet 26 that is long in the up-down vertical direction and short in the horizontal direction, and in an inner front portion of the air outlet 26, a front movable louver 23 is disposed along the up-down longitudinal direction, and the air outlet 26 is inclined so as to retract one (right) side portion to the upstream side and project the other (left) side portion to the downstream side. In addition, for the same structural parts the same as those of the register described above, the same reference signs as above will be used in FIGS. 7 and 8 and descriptions thereof will be omitted.

As shown in FIGS. 7 and 8, for the front movable louver 23, one central vertical fin 27 is axially supported so as to be turnable in the up-down vertical direction substantially at the right-left center inside the air outlet 26, while a retraction-side auxiliary vertical fin 28 is axially supported so as to be storable and turnable in the up-down vertical direction in a storing recess 6a provided on a retraction-side side wall surface in the air outlet 26. Similarly, in a storing recess 6b provided on a projection-side side wall surface in the air outlet 26, a projection-side auxiliary vertical fin 29 is axially supported so as to be storable and turnable in the up-down vertical direction.

The central vertical fin 27 is axially supported so as to be turnable by pivots 27a provided so as to project at an upper portion and lower portion substantially in the right-left center. The retraction-side auxiliary vertical fin 28 and the projection-side auxiliary vertical fin 29 are axially supported turnably in a manner of sticking out downstream-side end portions to the passage side. Moreover, the projection-side auxiliary vertical fin 29 of the front movable louver 23 is arranged at a downstream-side position further than the retraction-side auxiliary vertical fin 28, and the front-rear position of the pivots 29a of the projection-side auxiliary vertical fin 29 is arranged substantially at the same position as that of pivots 27a of the central vertical fin 27. The front-rear position of the pivots 28a of the retraction-side auxiliary vertical fin 28 is arranged substantially at the same position as that of an upstream-side end portion of the central vertical fin 27, which is on the upstream side further than the projection-side auxiliary vertical fin 29.

The front movable louver 23 is configured such that, when the central vertical fin 27 is turned to the projection side (left side) of the air outlet 26, the projection-side auxiliary vertical fin 29 sticks out the downstream-side end portion toward the passage side to block an air flow that passes through the section between the central vertical fin 27 and the projection-side auxiliary vertical fin 29 and proceeds straight ahead.

When air is blown straight in front of the register, as in FIGS. 7 and 8, the central vertical fin 27 of the front movable louver 23 is brought into a state oriented straight ahead. In this state, the retraction-side auxiliary vertical fin 28 and the projection-side auxiliary vertical fin 29 both keep a state parallel to the passage 5 and are stored inside the storing recesses 6a and 6b on the side wall surfaces of the passage 5. Consequently, an air flow flowing in the passage 5 is, with little air resistance received due to the retraction-side auxiliary vertical fin 28 and the projection-side auxiliary vertical fin 29, blown in the forward direction to which the central vertical fin 27 is oriented with very small pressure loss. Thus, as compared with a normal register for which three horizontal fins are provided side by side at the air outlet, pressure loss can be reduced.

On the one hand, when the operation knob 16 is operated to turn the central vertical fin 27 to the observer's right side (retraction side of the air outlet 26) as in FIG. 8, the retraction-side auxiliary vertical fin 28 and the projection-side auxiliary vertical fin 29 turn in a manner of sticking out their downstream-side edge portions to the inside of the passage 5 due to an operation of the crank 11, the first cam member 13, and the second cam member 14 of the fin turning mechanism 10, and the retraction-side auxiliary vertical fin 28 turns to be oriented obliquely to the left side, and the projection-side auxiliary vertical fin 29 turns to be oriented obliquely to the right side.

Thus, an air flow flowing from the passage 5 toward the air outlet 26 is gathered near the center of the passage 5 by the retraction-side auxiliary vertical fin 28 and the projection-side auxiliary vertical fin 29, and particularly, an air flow flowing at the right side in the passage 5 gathers near the central vertical fin 27 due to the retraction-side auxiliary vertical fin 28 oriented obliquely to the left side, and the air flow gathered near the central vertical fin 27 flows along the central vertical fin 27, and is blown obliquely toward the right side to which the central vertical fin 27 is oriented.

Moreover, because the projection-side auxiliary vertical fin 29 is oriented obliquely to the right side which is the same in direction as the central vertical fin 27, an air flow passing through the section between the central vertical fin 27 and the retraction-side auxiliary vertical fin 28 can be efficiently blown obliquely to the right side, and moreover, because the projection-side auxiliary vertical fin 29 is oriented obliquely to the right side in a manner of sticking out to the right side from the storing recess 6b, virtually no air flow that flows straight forward in a clearance with the side wall surface occurs.

On the one side, the retraction-side auxiliary vertical fin 28 operates so as to turn to the left side from the storing recess 6a in a manner of sticking out its downstream-side end portion to the inside of the passage 5 to gather an air flow flowing in the passage 5 near the periphery of the central vertical fin 27, and thus generates an air flow along the central vertical fin 27, and virtually no air flow that flows straight forward in a clearance between the side wall surface of the passage 5 and the retraction-side auxiliary vertical fin 28 occurs.

Therefore, an air flow flowing along the central vertical fin 27 is not disturbed as in a normal register for which three horizontal fins are provided, and flows smoothly, and directionality when the central vertical fin 27 of the front movable louver 23 is turned right can be greatly increased.

On the other hand, when the operation knob 16 is operated to turn the central vertical fin 27 to the observer's left side (projection side of the air outlet) as in FIG. 8, the retraction-side auxiliary vertical fin 28 and the projection-side auxiliary vertical fin 29 turn in a manner of sticking out their downstream-side end portions to the inside of the passage 5 due to an operation of the crank 11, the first cam member 13, and the second cam member 14 of the fin turning mechanism 10, and the retraction-side auxiliary vertical fin 28 turns to be oriented obliquely to the left side together with the central vertical fin 27, and the projection-side auxiliary vertical fin 29 turns to be oriented obliquely to the right side.

Thus, an air flow flowing from the passage 5 toward the air outlet 26, particularly, an air flow flowing at the right side of the passage 5 is guided to the inside by the retraction-side auxiliary vertical fin 28 to gather at the central vertical fin 27 side, and flows along the central vertical fin 27, passes through the section between the retraction-side auxiliary vertical fin 28 and the central vertical fin 27, and is blown obliquely toward the left side to which the central vertical fin 27 is oriented.

At this time, because the retraction-side auxiliary vertical fin 28 reaches a state sticking out obliquely to the left side from the storing recess 6a to the passage 5 side, virtually no air flow that flows straight forward in a clearance between the side wall surface of the passage 5 and the retraction-side auxiliary vertical fin 28 occurs, and an air flow is satisfactorily guided obliquely to the left side by the central vertical fin 27, and blown.

On the one hand, the projection-side auxiliary vertical fin 29 operates so as to turn to the right side in a manner of sticking out its downstream-side end portion to the inside of the passage 5 to approximate the tip end of the fin as if making it contact a left surface of the central vertical fin 27. Thus, an air flow that flows straight forward near the side wall surface of the passage 5 and the projection-side auxiliary vertical fin 29 is blocked, which does not have influence on an air flow blown toward the left side along the central vertical fin 27.

Therefore, also when the central vertical fin 27 is turned to the left side, an air flow flowing along the central vertical fin 27 flows satisfactorily without being disturbed as in a normal register for which three horizontal fins are provided, and even in the register having the air outlet 26 inclined to the right side (retraction side), the directionality of wind when the central vertical fin 27 of the front movable louver 23 is turned to the left side (projection side) can be greatly increased.

In the above-described embodiments, the operation to incline the upper auxiliary horizontal fin 8 and the lower auxiliary horizontal fin 9 or the retraction-side auxiliary vertical fin 28 and the projection-side auxiliary vertical fin 29 in a manner of sticking out to the inside of the passage 5 following a turn of the central horizontal fin 7 or the central vertical fin 27 is realized by the turning mechanism 10 using the crank 11, the first cam member 13, and the second cam member 14, however, the operation of the upper auxiliary horizontal fin 8 and the lower auxiliary horizontal fin 9 or the retraction-side auxiliary vertical fin 28 and the projection-side auxiliary vertical fin 29 described above can also be realized by using another linkage mechanism, cam mechanism, motor-driven mechanism, or the like.

Moreover, in the above-described embodiments, a rectangular air outlet 15, 26 is provided, however, it is not necessarily rectangular, and an air outlet having a different narrow and long shape like an oval is also possible.

Moreover, the storing recesses 6a and 6b to store the upper auxiliary horizontal fin 8 and the lower auxiliary horizontal fin 9 or the retraction-side auxiliary vertical fin 28 and the projection-side auxiliary vertical fin 29 are provided as stepped recesses with steps, however, as long as the recesses can store the upper auxiliary horizontal fin 8 and the lower auxiliary horizontal fin 9 or the retraction-side auxiliary vertical fin 28 and the projection-side auxiliary vertical fin 29, their shapes are arbitrary such as recesses having recessed curved surfaces.

Moreover, the air outlet 26 in FIGS. 7 and 8 described above is inclined so as to retract the observer's right side portion to the upstream side and project the left side portion to the downstream side, however, an air outlet can also be formed inclined, conversely thereto, so as to retract the observer's left side portion to the upstream side and project the right side portion to the downstream side, and in this case, the right and left positional relationship of the retraction-side auxiliary vertical fin and projection-side auxiliary vertical fin is opposite to the above.

Figure 9:
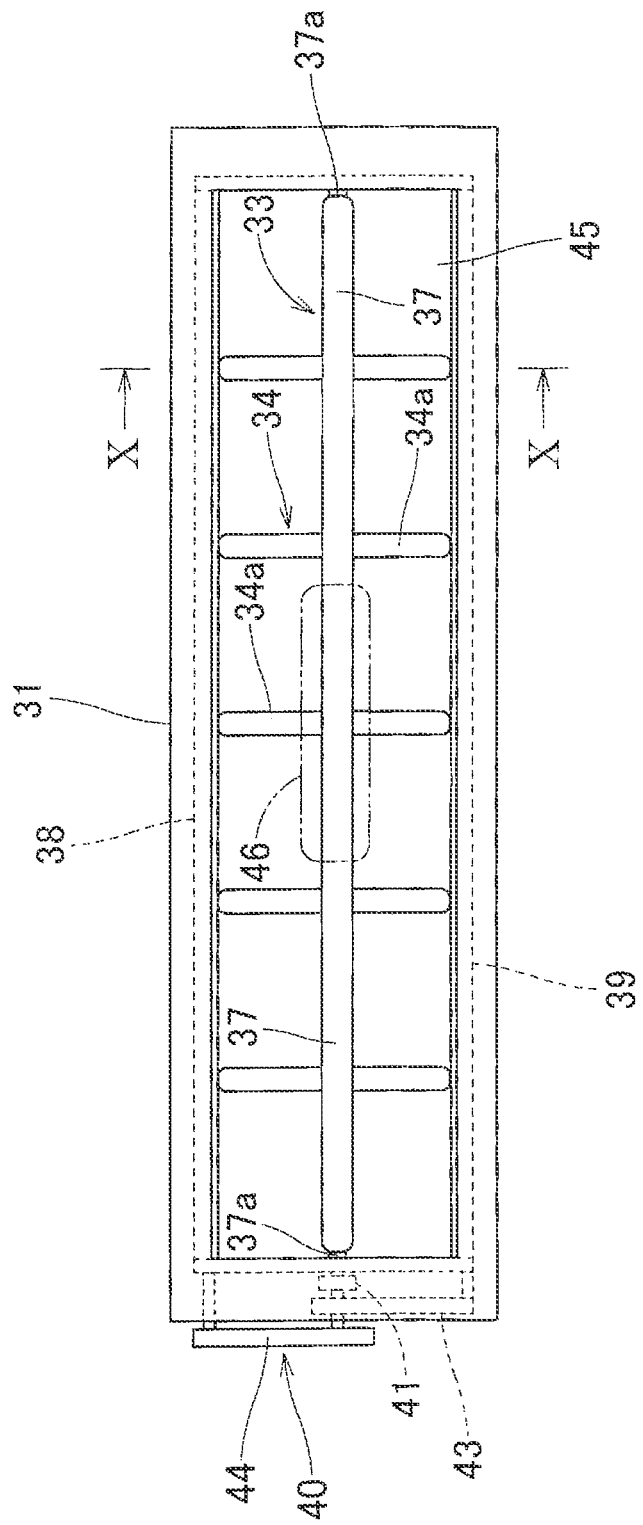
FIG. 9 is a front view of a register of a third embodiment

FIG. 9 to FIG. 12 show a register of a third embodiment. Similar to the register of the first embodiment, as shown in FIG. 9, this register is a thin register having a narrow and long air outlet 45 that is long in the horizontal direction and short in the up-down vertical direction, a front movable louver 33 is disposed along the horizontal direction in an inner front portion of the air outlet 45, and the air outlet 45 is formed inclined so as to retract an upper portion to the upstream side and project a lower portion to the downstream side. In addition, for the same parts as those of the embodiments described above, the same reference signs as above will be used in the Figs. to omit descriptions thereof.

The front movable louver 33 is configured such that, as shown in FIG. 9, one central horizontal fin 37 is axially supported so as to be turnable in the horizontal direction substantially at the up-down center inside the air outlet 45, while an upper auxiliary horizontal fin 38 is axially supported so as to be storable and turnable in the horizontal direction in a storing recess 36a provided on an upper wall surface inside the air outlet 45, and a lower auxiliary horizontal fin 39 is axially supported so as to be storable and turnable in the horizontal direction in a storing recess 36b provided on a lower wall surface inside the air outlet 45. The central horizontal fin 37 is axially supported so as to be turnable by pivots 37a provided at both sides of a downstream-side end portion, and the upper auxiliary horizontal fin 38 and the lower auxiliary horizontal fin 39 are axially supported so as to be turnable by pivots 38a, 39a provided so as to project at both sides of an upstream-side end portion in a manner of sticking out their downstream-side end portions to the passage side.

Figure 10:
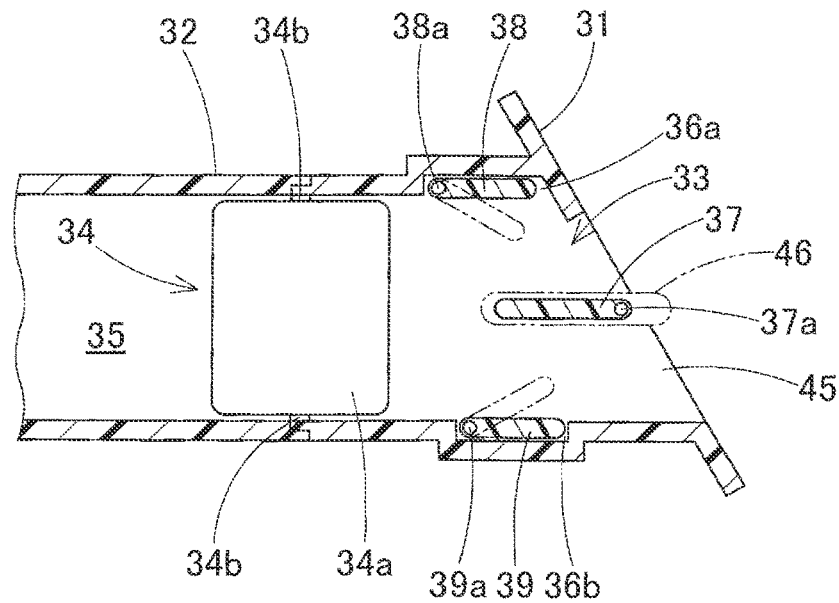
FIG. 10 is a sectional view along X-X of the same register.

In a bezel 31 that constitutes a front surface portion of the register, a horizontally long rectangular air outlet 45 is formed, and the air outlet 45 is, as shown in FIG. 10, formed inclined so as to retract its upper portion to the upstream side and project its lower portion to the downstream side. That is, the front surface of the air outlet 45 of the thin register is inclined at an angle of approximately 30 degrees obliquely downward with respect to a horizontal plane in its short-side direction, and is a so-called slanted shape.

At the back surface side of the bezel 31, a fitting portion for joining to a retainer 32 is provided, and a duct-like retainer 32 is fitted with and connected to the fitting portion. On right and left side walls inside of the air outlet 45 of the bezel 31, bearing portions for the front movable louver 33 are formed, and in the bearing portions provided on both sides, pivots 37a projecting at both end portions of the central horizontal fin 37 of the front movable louver 33 are supported, and similarly, pivots 38a projecting at both end portions of the upper auxiliary horizontal fin 38 and pivots 39a projecting at both sides of the lower auxiliary horizontal fin 39 are respectively supported, so that the central horizontal fin 37, the upper auxiliary horizontal fin 38, and the lower auxiliary horizontal fin 39 are turnable up and down in predetermined angular ranges.

The retainer 32 is formed like a duct having a horizontally long and rectangular-shaped cross-section similar to that of the air outlet 45, and is formed inside with a passage 35 for ventilation. Bearing portions are formed at predetermined intervals on an upper wall and lower wall of a downstream-side edge portion of the retainer 32, and as shown in FIG. 10, in those bearing portions, vertical fins 34a of a rear movable louver 34 are axially supported by pivots 34b, so that the respective vertical fins 34a turn to the right and left in conjunction with each other in a predetermined angular range. At a front portion of the retainer 32, the bezel 31 with a substantially rectangular air outlet 45 formed by opening in its front surface is fitted with its air outlet 45 aligned with the opening portion of the passage 35, and the passage 35 is formed communicating from the inside of the retainer 32 to the air outlet 45 of the bezel 31.

The front movable louver 33 includes one central horizontal fin 37 that is adjustable by turning upward and downward, an upper auxiliary horizontal fin 38 and a lower auxiliary horizontal fin 39 are disposed at positions above and under the central horizontal fin 37 that turn up and down according to a turning operation of the central horizontal fin 37, and a fin turning mechanism 40 (FIG. 9) that turns the upper auxiliary horizontal fin 38 and the lower auxiliary horizontal fin 39 in conjunction with a turn of the central horizontal fin 37.

The central horizontal fin 37 has pivots 37a provided so as to project at both ends, and as shown in FIG. 9 and FIG. 10, one pivot 37a penetrates through a side wall of the passage 35 to project to the outside, and a crank 11 is pivotally attached to the tip end of the pivot 37a. The pivot 37a of the central horizontal fin 37 is located near a front end portion of the fin in a plan view, and the positions of the pivots 38a and 39a of the upper auxiliary horizontal fin 38 and the lower auxiliary horizontal fin 39 are located near upstream-side end portions of the respective fins in a plan view.

Figure 11:
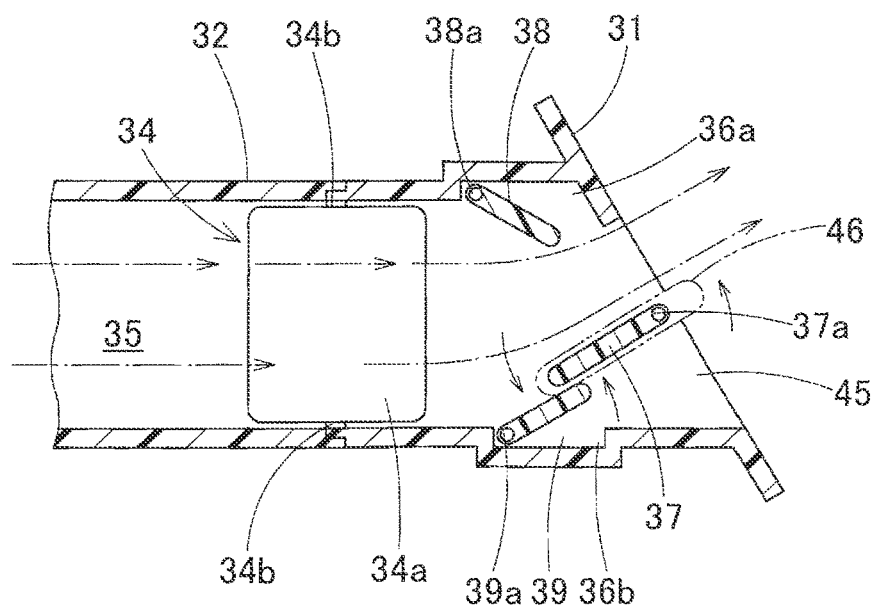
FIG. 11 is a sectional view when a front movable louver is turned up.

Moreover, as in FIG. 11, when the central horizontal fin 37 is turned upward, the upper auxiliary horizontal fin 38 and the lower auxiliary horizontal fin 39 turn so that their downstream-side end portions stick out to the passage 35 side and the lower auxiliary horizontal fin 39 becomes parallel to the central horizontal fin 37 and the fins approximate each other to function as one large-sized fin. That is, when the central horizontal fin 37 is turned obliquely upward, a mode is brought about in that the lower auxiliary horizontal fin 39 becomes parallel to the central horizontal fin 37 and a front portion of the lower auxiliary horizontal fin 39 approximates a rear portion of the central horizontal fin 37, so as to provide a function of one large-sized fin.

Figure 12:
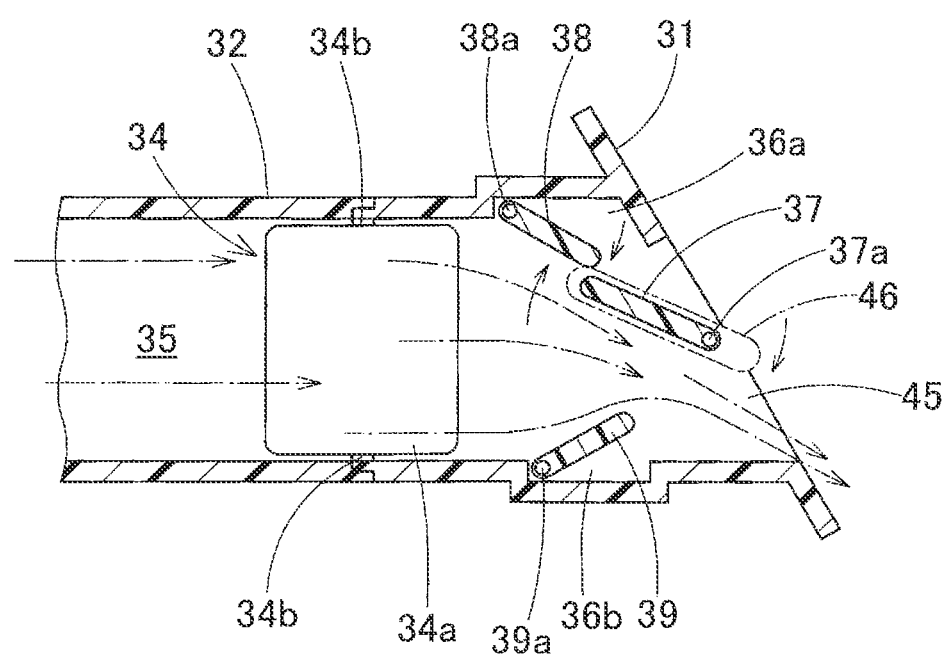
FIG. 12 is a sectional view when a front movable louver is turned down.

Moreover, as in FIG. 12, when the central horizontal fin 37 is turned downward, the upper auxiliary horizontal fin 38 and the lower auxiliary horizontal fin 39 turn so that their downstream-side end portions stick out to the passage 35 side and the upper auxiliary horizontal fin 38 becomes parallel to the central horizontal fin 37 and the fins approximate each other to function as one large-sized fin.

As shown in FIG. 10, the upper auxiliary horizontal fin 38 is arranged adjacent to an upper wall surface in the passage 35, while a storing recess 36a is formed on the upper wall surface, and the upper auxiliary horizontal fin 38 is stored and hidden in a horizontal state inside the storing recess 36a. Moreover, the lower auxiliary horizontal fin 39 is a structure in which this is arranged adjacent to a lower wall surface in the passage 35, while a storing recess 36b is formed on the lower wall surface, and the lower auxiliary horizontal fin 39 is stored and hidden in a horizontal state inside the storing recess 36b. The upper auxiliary horizontal fin 38 and the lower auxiliary horizontal fin 39 are formed with shorter widths in the front-rear direction than the width in the front-rear direction of the central horizontal fin 7.

That is, the front-rear width of the central horizontal fin 37 is formed wider than the front-rear widths of the upper auxiliary horizontal fin 38 and the lower auxiliary horizontal fin 39, and the central horizontal fin 37, in a plan view thereof, overlaps at its upstream-side end portion with the upper auxiliary horizontal fin 38, and a downstream-side end portion of the central horizontal fin 37 overlaps the lower auxiliary horizontal fin 39. Moreover, the upper auxiliary horizontal fin 8 and the lower auxiliary horizontal fin 39 turn at the positions above or under the central horizontal fin 37 in a manner of sticking out their downstream-side end portions in a horizontal state to the passage 35 side.

Further, as shown in FIG. 10, the pivots 38a of the upper auxiliary horizontal fin 38 are provided so as to project at both sides near an upstream-side end portion of the upper auxiliary horizontal fin 38, and the pivots 39a of the lower auxiliary horizontal fin 39 are provided so as to project at both sides near an upstream-side end portion of the lower auxiliary horizontal fin 39. The pivots 37a of the central horizontal fin 37 are located near its downstream-side end portion (front portion side), and thus located at the side opposite to the pivots 38a and 39a of the upper auxiliary horizontal fin 38 and the lower auxiliary horizontal fin 39 whose pivots are located at upstream-side end portions (rear portion side).

As shown in FIG. 9, a fin turning mechanism 40 is provided outside a left side surface of the bezel 31 in order to cause the upper auxiliary horizontal fin 38 and the lower auxiliary horizontal fin 39 to turn in conjunction as described above when the central horizontal fin 37 is turned upward or downward. This fin turning mechanism 40 has the same structure as that of the fin turning mechanism 10 (FIG. 4) of the above-described first embodiment, and is, as shown in FIG. 9, composed of a crank 41 pivotally attached to the pivot 37a of the central horizontal fin 37, a first cam member 43 pivotally attached to the pivot 38a of the upper auxiliary horizontal fin 38, and a second cam member 44 pivotally attached to the pivot 39a of the lower auxiliary horizontal fin 39.

The upper auxiliary horizontal fin 38 and the lower auxiliary horizontal fin 39 that turn in conjunction due to an operation of the fin turning mechanism 40 have a horizontal posture to reach a state stored in the storing recesses 36a and 36b, respectively, due to an action of the crank 41, the first cam member 43, and the second cam member 44, when the central horizontal fin 37 is oriented straight forward to set the direction in the up-down direction thereof to the horizontal direction as in FIGS. 9 and 10.

On the one hand, when the central horizontal fin 37 is turned to the upside as in FIG. 11, that is, when the direction of the central horizontal fin 37 is turned upward, the upper auxiliary horizontal fin 38 turns in a manner of sticking out to the downside, the lower auxiliary horizontal fin 39 turns to the upside to become parallel to the central horizontal fin 37 and turns so that a front end portion of the lower auxiliary horizontal fin 39 approximates a rear end portion of the central horizontal fin 37, so as to provide a function of one large-sized fin.

On the other hand, when the central horizontal fin 37 is turned to the upside as in FIG. 12, that is, when the direction of the central horizontal fin 37 is turned downward, the lower auxiliary horizontal fin 39 turns in a manner of sticking out to the downside, the upper auxiliary horizontal fin 38 turns to the downside to become parallel to the central horizontal fin 37 and turns so that a front end portion of the upper auxiliary horizontal fin 38 approximates a rear end portion of the central horizontal fin 37, so as to provide a function of one large-sized fin.

A rear movable louver 34 is disposed in the passage 35 and upstream from the front movable louver 33. In the rear movable louver 34, a plurality of vertical fins 34a are provided vertically side by side at fixed intervals left horizontally. Each vertical fin 34a has pivots 34b provided so as to project at an upper portion and lower portion, and the upper and lower pivots 34b are axially supported in bearing portions provided on the upper wall and lower wall of the passage 35, and supported so as to be turnable rightward and leftward.

On the above-described central horizontal fin 37, as shown in FIGS. 9 and 10, an operation knob 46 is externally fitted so as to be slidable in the right-left longitudinal direction to provide a structure for grasping the operation knob 46 to make the central horizontal fin 37 turnable in the up-down direction and turning the rear movable louver 34 to the right or left to change the wind direction to the right or left by sliding the operation knob 46 in the right-left direction.

Therefore, at a rear portion of the operation knob 46, an engaging portion to engage with one longitudinal fin 34a of the rear movable louver 34 is provided, and at the pivots 34b of all vertical fins 34a including that vertical fin 34a, cranks (not shown) are pivotally attached, and crankshafts of the respective cranks are mutually joined by one link bar. Accordingly, a structure is provided in that, when the operation knob 46 is slid to the right or left on the central horizontal fin 37, the respective vertical fins 34a of the rear movable louver 34 turn to the right or left in conjunction so as to adjust the wind direction to the right or left.

Next, as description of the operation of the register configured as described above, when air is blown straight in front of the register, as in FIG. 10, the central horizontal fin 37 of the front movable louver 33 is brought into a horizontal state, that is, a state oriented straight ahead.

In this state, the upper auxiliary horizontal fin 38 and the lower auxiliary horizontal fin 39 both keep a horizontal state and are in a state stored and hidden inside the storing recesses 36a and 36b on the upper wall surface and lower wall surface of the passage 35. Consequently, an air flow flowing in the passage 35 is, with little air resistance received due to the upper auxiliary horizontal fin 38 and the lower auxiliary horizontal fin 39, blown in the horizontal forward direction to which the central horizontal fin 37 is oriented with very small pressure loss. Thus, as compared with a normal register for which three horizontal fins are provided side by side at the air outlet, pressure loss during a horizontal adjustment can be reduced.

On the one hand, when the operation knob 46 is operated to turn the central horizontal fin 37 upward to be oriented obliquely upward as in FIG. 11, the upper auxiliary horizontal fin 38 and the lower auxiliary horizontal fin 39 turn in a manner of sticking out their downstream-side end portions to the inside of the passage 35 due to an operation of the crank 41, the first cam member 43, and the second cam member 44 of the fin turning mechanism 40, and the upper auxiliary horizontal fin 38 turns to be oriented obliquely downward, and the lower auxiliary horizontal fin 39 turns to be oriented obliquely upward.

At this time, as in FIG. 11, the lower auxiliary horizontal fin 39 becomes substantially parallel to the central horizontal fin 37 oriented obliquely upward, its front end portion approximates (or contacts) a rear end portion of the central horizontal fin 37, and the lower auxiliary horizontal fin 39 and the central horizontal fin 37 as one reach a state to function as one large-sized fin.

Thus, an air flow flowing from the passage 35 toward the air outlet 45 is, as shown in FIG. 11, satisfactorily guided by the lower auxiliary horizontal fin 39 and the central horizontal fin 37 that function as a large-sized fin, and blown obliquely upward. Moreover, at this time, an air flow flowing in an upper portion of the passage 35 is gathered near an upper surface of the central horizontal fin 37 in a manner such that wind is pushed there against because the upper auxiliary horizontal fin 38 sticks out obliquely downward, and accordingly, a state is brought about in that an air flow efficiently flows along the central horizontal fin 37, so that air blowing is satisfactorily performed obliquely upward to which the central horizontal fin 37 is oriented.

Moreover, because the upper auxiliary horizontal fin 38 reaches a state sticking out obliquely downward from the storing recess 36a to the passage 35 side and the lower auxiliary horizontal fin 39 is integrated with the central horizontal fin 37, virtually no air flow that flows straight forward in the passage 35 occurs, so that an air flow is satisfactorily guided obliquely upward by the central horizontal fin 37.

On the other hand, as in FIG. 12, when the operation knob 46 is operated to turn the central horizontal fin 37 downward to be oriented obliquely downward, the upper auxiliary horizontal fin 38 and the lower auxiliary horizontal fin 39 turn in a manner of sticking out their downstream-side end portions to the inside of the passage 35 due to an operation of the crank 41, the first cam member 43, and the second cam member 44 of the fin turning mechanism 40.

At this time, as in FIG. 12, the upper auxiliary horizontal fin 38 becomes parallel with respect to the central horizontal fin 37 and its front end portion approximates (or contacts) near a rear end portion of the central horizontal fin 37, and the upper auxiliary horizontal fin 38 and the central horizontal fin 37 as one reach a state to function as one large-sized fin.

Thus, an air flow flowing from the passage 35 toward the air outlet 45 is, as shown in FIG. 12, satisfactorily guided by the upper auxiliary horizontal fin 38 and the central horizontal fin 37 that function as a large-sized fin, and blown obliquely downward. Moreover, at this time, an air flow flowing in a lower portion of the passage 35 is gathered near a lower surface of the central horizontal fin 37 in a manner such that wind is pushed there against because the lower auxiliary horizontal fin 39 sticks out obliquely upward, and accordingly, as in FIG. 12, a state is brought about in that an air flow efficiently flows along the central horizontal fin 37, so that air blowing is satisfactorily performed obliquely downward to which the central horizontal fin 37 is oriented.

Moreover, at this time, because the lower auxiliary horizontal fin 39 reaches a state sticking out obliquely upward from the storing recess 36b to the passage 35 side and the upper auxiliary horizontal fin 38 is integrated with the central horizontal fin 37, virtually no air flow that flows straight forward in the passage 35 occurs, so that an air flow is satisfactorily guided obliquely downward by the central horizontal fin 37.

In this manner, when the central horizontal fin 37 is turned downward, an air flow flowing along the central horizontal fin 37 is no longer disturbed as in a normal register for which three horizontal fins are provided, and even in the register having the air outlet 45 inclined to the downside, the directionality of wind when the central horizontal fin 37 of the front movable louver 33 is turned down can be greatly increased.

Moreover, because the pivots 37a of the central horizontal fin 37 are located in the downstream-side end portion, when the central horizontal fin 37 is turned up or down, a part that appears at the front surface side to change is small, which makes the external appearance of the register excellent. Moreover, because the pivots 37a of the central horizontal fin 37 are located in the downstream-side end portion, the operation knob 46 fitted slidably to the central horizontal fin 37 can have a long forward projection length, and accordingly, the operability of the operation knob 46 can be enhanced.

Figure 13:
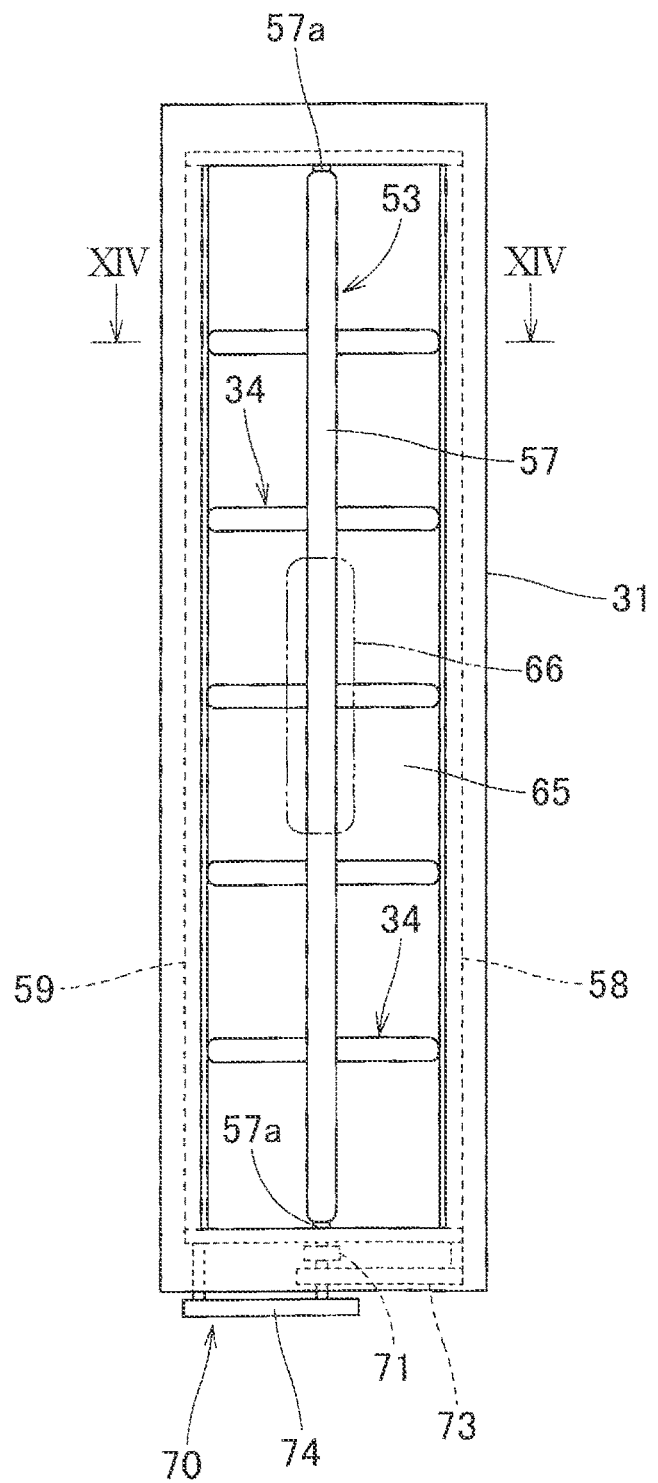
FIG. 13 is a front view of a register of a fourth embodiment.
Figure 14:
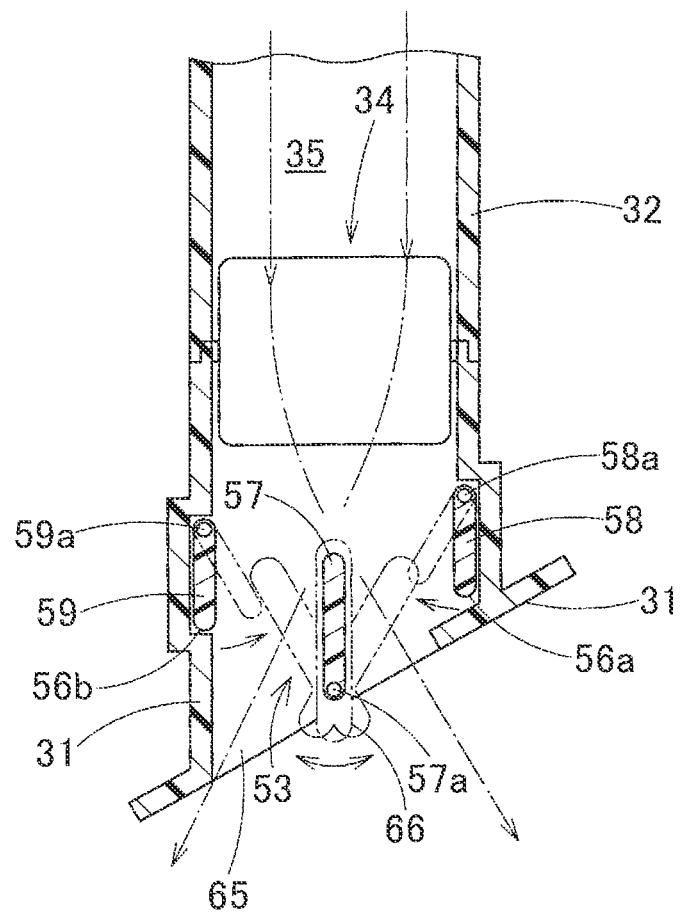
FIG. 14 is a sectional view along XIV-XIV of the same register.

FIG. 13 and FIG. 14 show a register of the fourth embodiment. This register is, as shown in the same Figs., as its front surface shape, in a shape of the register of the third embodiment turned over 90 degrees, and has a vertically long rectangular-shaped air outlet 65 that is long in the up-down vertical direction and short in the horizontal direction, and in an inner front portion of the air outlet 65, a front movable louver 53 is disposed along the up-down longitudinal direction, and the air outlet 65 is inclined so as to retract one (right) side portion to the upstream side and project the other (left) side portion to the downstream side. In addition, for the same structural parts the same as those of the register described above, the same reference signs as above will be used in the Figs. and descriptions thereof will be omitted.

As shown in FIGS. 13 and 14, for the front movable louver 53, one central vertical fin 57 is axially supported so as to be turnable by pivots 57a in the up-down vertical direction substantially at the right-left center inside the air outlet 65. Further, a storing recess 56a is provided on a retraction-side side wall surface inside the air outlet 65, and a retraction-side auxiliary vertical fin 58 is axially supported so as to be storable and turnable by pivots 58a in the up-down vertical direction inside the storing recess 56a.

Similarly, a storing recess 56b provided on a projection-side side wall surface inside the air outlet 65, and a projection-side auxiliary vertical fin 59 is axially supported so as to be storable inside the storing recess 56b and turnable by pivots 59a in the up-down vertical direction. The central vertical fin 57 is axially supported to be turnable, by pivots 57a provided so as to project at an upper portion and lower portion, substantially in the right-left center of the air outlet 65.

The retraction-side auxiliary vertical fin 58 and the projection-side auxiliary vertical fin 59 are, by the pivots 58a, 59a provided in their upstream-side end portion, axially supported turnably in a manner of sticking out their downstream-side end portions to the passage 35 side. Particularly, when the central vertical fin 57 is turned to the right side, that is, the retraction side of the air outlet 65, the retraction-side auxiliary vertical fin 58 sticks out its downstream-side end portion toward the passage 35 side and reaches a state parallel with respect to the central vertical fin 57, and a front edge portion of the retraction-side auxiliary vertical fin 58 approximates (or contacts) a rear edge portion of the central vertical fin 57, and the fins reach a state to function as one large-sized fin. Moreover, the projection-side auxiliary vertical fin 59 on the opposite side is structured so as to stick out its downstream-side end portion toward the passage 35 side and guide an air flow in a direction to push against the central vertical fin 57 side.

Similarly, when the central vertical fin 57 is turned to the left side, that is, the projection side of the air outlet 65, the projection-side auxiliary vertical fin 59 sticks out its downstream-side end portion toward the passage 35 side and reaches a state parallel to the central vertical fin 57, and a front edge portion of the projection-side auxiliary vertical fin 59 approximates (or contacts) a rear edge portion of the central vertical fin 57, and the fins reach a state to function as one large-sized fin. Moreover, at this time, the retraction-side auxiliary vertical fin 58 is structured so as to stick out its downstream-side end portion toward the passage 35 side and push an air flow against the central vertical fin 57 side while letting the same flow.

An operation knob 66 is externally fitted on the central vertical fin 57 so as to be slidable in the up-down longitudinal direction. The operation knob 66 turns the central vertical fin 57 to change its direction to the right or left, and turns the rear movable louver 34 to change its direction to up or down. Therefore, at a rear portion of the operation knob 66, similar to the above, a rack portion is provided, and on a horizontal fin of the rear movable louver 34 on the upstream side, a sector toothed portion to engage with the rack portion is provided. The plurality of horizontal fins are axially supported so as to be turnable by pivots in the horizontal direction, the respective horizontal fins are joined by a link bar to turn in synchronization and conjunction with each other. The rear movable louver 34 thus configured is a structure in that the rear movable louver 34 in the upstream-side rear portion changes the direction to up and down in response to an up-down movement operation of the operation knob 66.

Because the pivots 57a of the central vertical fin 57 are located in a front portion of the fin, that is, near the downstream-side end portion, when the central vertical fin 57 is turned, its rear portion at the upstream side can be greatly turned, and accordingly, directionality during air blowing adjustment can be enhanced. Moreover, because the pivots 57a of the central vertical fin 57 are located in the downstream-side front portion, when the central vertical fin 57 is turned to the right or left, a part that appears at the front surface side to change is small, which makes the external appearance of the register excellent. Moreover, because the pivots 57a of the central vertical fin 57 are located in the downstream-side front portion, the operation knob 66 fitted slidably to the central vertical fin 57 can have a long forward projection length, and accordingly, the operability of the operation knob can be enhanced.

Next, as description of the operation of the register configured as described above, when air is blown straight in front of the register, the central vertical fin 57 of the front movable louver 53 is brought into a state oriented straight ahead. In this state, the retraction-side auxiliary vertical fin 58 and the projection-side auxiliary vertical fin 59 both keep a state parallel to the side walls of the passage and are in a state stored and hidden inside the storing recesses 56a and 56b on the upper wall surface and lower wall surface of the passage 35. Consequently, an air flow flowing in the passage 35 is, with little air resistance received due to the retraction-side auxiliary vertical fin 58 and the projection-side auxiliary vertical fin 59, blown in the vertical forward direction to which the central vertical fin 57 is oriented with very small pressure loss. Thus, as compared with a normal register for which three horizontal fins are provided side by side at the air outlet, pressure loss can be reduced.

On the one hand, when the operation knob 66 is operated to orient the central vertical fin 57 to the retraction side of the air outlet 65, the retraction-side auxiliary vertical fin 58 and the projection-side auxiliary vertical fin 59 turn in a manner of sticking out their downstream-side end portions to the inside of the passage 35 due to an operation of a crank 71, a first cam member 73, and a second cam member 74 of a fin turning mechanism 70, and the retraction-side auxiliary vertical fin 58 turns to be oriented obliquely leftward, and the projection-side auxiliary vertical fin 59 turns to be oriented obliquely rightward.

At this time, the projection-side auxiliary vertical fin 59 becomes substantially parallel with respect to the central vertical fin 57 oriented obliquely rightward, its front end portion approximates (or contacts) a rear end portion of the central vertical fin 57, and the projection-side auxiliary vertical fin 59 and the central vertical fin 57 as one reach a state to function as one large-sized fin.

Thus, an air flow flowing from the passage 35 toward the air outlet 65 is, as shown in FIG. 14, satisfactorily guided by the projection-side auxiliary vertical fin 59 and the central vertical fin 57 that function as a large-sized fin, and blown obliquely to the right side. Moreover, at this time, an air flow flowing at the right of the passage 35 is gathered near a side surface of the central vertical fin 57 in a manner such that wind is pushed there against because the retraction-side auxiliary vertical fin 58 sticks out to the center side of the passage, and accordingly, a state is brought about in that an air flow efficiently flows along the central vertical fin 57, so that air blowing is satisfactorily performed obliquely rightward to which the central vertical fin 57 is oriented.

Moreover, at this time, the projection-side auxiliary vertical fin 59 reaches a state sticking out obliquely to the right side from the storing recess 56b to the passage 35 side, the projection-side auxiliary vertical fin 59 and the central vertical fin 57 approximate to be integrated with each other and function so as to be a large-sized fin, and an air flow is satisfactorily guided to the right side by the central vertical fin 57 and the projection-side auxiliary vertical fin 59.

On the other hand, when the operation knob 66 is operated to cause a turning operation of the central vertical fin 57 to the projection side (left side) of the air outlet 65, the retraction-side auxiliary vertical fin 58 and the projection-side auxiliary vertical fin 59 turn in a manner of sticking out their downstream-side end portions to the inside of the passage 35 due to an operation of the crank 71, the first cam member 73, and the second cam member 74 of the fin turning mechanism 70.

At this time, as in FIG. 14, the retraction-side auxiliary vertical fin 58 becomes parallel with respect to the central vertical fin 57 and its front end portion approximates (or contacts) near a rear end portion of the central vertical fin 57, and the retraction-side auxiliary vertical fin 58 and the central vertical fin 57 as one reach a state to function as one large-sized fin.

Thus, an air flow flowing from the passage 35 toward the air outlet 65 is, as shown in FIG. 14, satisfactorily guided by the retraction-side auxiliary vertical fin 58 and the central vertical fin 57 that function as a large-sized fin, and blown obliquely to the left side. Moreover, at this time, an air flow flowing at the left side in the passage 35 is gathered near a side surface of the central vertical fin 57 in a manner such that wind is pushed there against because the projection-side auxiliary vertical fin 59 sticks out to the center side of the passage, and accordingly, a state is brought about in that an air flow efficiently flows along the central vertical fin 57, so that air blowing is satisfactorily performed obliquely leftward to which the central vertical fin 57 is oriented.

In this manner, when the central vertical fin 57 is turned to the right or left, an air flow flowing along the central vertical fin 57 is no longer disturbed as in a normal register for which three horizontal fins are provided, and even in the register having the air outlet 65 inclined in the right-left short-side direction, the directionality of wind when the central vertical fin 57 of the front movable louver 53 is turned to the right or left can be greatly increased.

Moreover, because the pivots 57a of the central vertical fin 57 are located in the downstream-side end portion, when the central vertical fin 57 is turned to the right or left, a part that appears at the front surface side to change is small, which makes the external appearance of the register excellent. Moreover, because the pivots 57a of the central vertical fin 57 are located in the downstream-side end portion, the operation knob 66 fitted slidably to the central vertical fin 57 can have a long forward projection length, and accordingly, the operability of the operation knob 66 can be enhanced.

While at least one exemplary embodiment has been presented in the foregoing summary and detailed description, it should be appreciated that a vast number of variations exist. It should also be appreciated that the exemplary embodiment or exemplary embodiments are only examples and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A register, comprising:
   a narrow and long air outlet that is long in a horizontal direction and short in an up-down vertical direction; and
   a front movable louver disposed along said horizontal direction in an inner front portion of said narrow and long air outlet, said narrow and long air outlet formed inclined so as to retract an upper portion to an upstream side and project a lower portion to a downstream side,
   wherein for said front movable louver, one central horizontal fin is axially supported so as to be turnable about a first pivot axis parallel to said horizontal direction substantially at an up-down center inside said narrow and long air outlet, while an upper auxiliary horizontal fin is axially supported so as to be storable and turnable about a second pivot axis parallel to said horizontal direction in a storing recess provided on an upper wall surface inside said narrow and long air outlet, and a lower auxiliary horizontal fin is axially supported so as to be storable and turnable about a third pivot axis parallel to said horizontal direction in a storing recess provided on a lower wall surface inside said narrow and long air outlet, and
   wherein said central horizontal fin is axially supported so as to be turnable by pivots provided so as to project therefrom, said upper auxiliary horizontal fin and lower auxiliary horizontal fin are axially supported so as to be turnable in a manner of sticking out downstream-side end portions to a passage side, and when said central horizontal fin is turned to the downside, said lower auxiliary horizontal fin sticks out the downstream-side end portion toward the passage side and approximates the downstream-side end portion, substantially making said downstream-side end portion contact a lower surface of said central horizontal fin to block an air flow that passes through a section between said central horizontal fin and said lower auxiliary horizontal fin and proceeds straight ahead;
   wherein the lower auxiliary horizontal fin of the front movable louver is arranged at a downstream-side position further than the upper auxiliary horizontal fin, and said second and third pivot axes of said upper and lower auxiliary horizontal fins are arranged at the upstream-side end portions of the fins respectively, and a position of said third pivot axis of said lower auxiliary horizontal fin is arranged substantially in the same vertical plane as that of said first pivot axis of said central horizontal fin.

2. The register according to claim 1, wherein on an upstream side of the front movable louver, a rear movable louver with a large number of rear fins are provided side by side and disposed turnably.

3. The register according to claim 2, wherein the rear fins are horizontal fins.

4. The register according to claim 2, wherein the rear fins are vertical fins.

5. A register, comprising:
   a narrow and long air outlet that is long in an up-down vertical direction and short in a horizontal direction; and
   a front movable louver disposed along said up-down vertical direction in an inner front portion of said narrow and long air outlet, said narrow and long air outlet being formed inclined so as to retract one side portion to an upstream side and project the other side portion to a downstream side,
   wherein for said front movable louver, one central vertical fin is axially supported so as to be turnable about a first pivot axis parallel to said up-down vertical direction substantially at a right-left center inside said narrow and long air outlet, while a retraction-side auxiliary vertical fin is axially supported so as to be storable and turnable about a second pivot axis parallel to said up-down vertical direction in a storing recess provided on a retraction-side side wall surface inside said narrow and long air outlet, and a projection-side auxiliary vertical fin is axially supported so as to be storable and turnable about a third pivot axis parallel to said up-down vertical direction in a storing recess provided on a projection-side side wall surface inside said narrow and long air outlet, and
   wherein said central vertical fin is axially supported so as to be turnable by pivots so as to project substantially at right-left centers, said projection-side auxiliary vertical fin and said retraction-side auxiliary vertical fin are axially supported so as to be turnable in a manner of sticking out downstream-side end portions to a passage side, and when said central vertical fin is turned to the projection side of said narrow and long air outlet, said projection-side auxiliary vertical fin sticks out the downstream-side end portion toward the passage side and approximates the downstream-side end portion, substantially making said downstream-side end portion contact a side surface of said central vertical fin to block an air flow that passes through a section between said central vertical fin and said projection-side auxiliary vertical fin and proceeds straight ahead;

wherein the projection-side auxiliary vertical fin of the front movable louver is arranged at a downstream-side position further than the retraction-side auxiliary vertical fin, and said second and third pivots of said projection-side and retraction-side auxiliary horizontal fins are arranged at the upstream-side end portions of the fins respectively, and a position of said third pivot axis of said projection-side auxiliary vertical fin is arranged substantially in the same vertical plane as that of said first pivot axis of said central vertical fin.

6. The register according to claim 5, wherein on an upstream side of the front movable louver, a rear movable louver with a large number of rear fins are provided side by side and disposed turnably.

7. The register according to claim 6, wherein the rear fins are horizontal fins.

8. The register according to claim 6, wherein the rear fins are vertical fins.

9. A register, comprising:
- a narrow and long air outlet that is long in a horizontal direction and short in an up-down vertical direction, formed inclined so as to retract an upper portion to an upstream side and project a lower portion to a downstream side,
- one central horizontal fin axially supported so as to be turnable about a first pivot axis parallel to said horizontal direction substantially at an up-down center inside said narrow and long air outlet, said central horizontal fin is axially supported so as to be turnable by first pivots,
- an upper auxiliary horizontal fin axially supported so as to be turnable about a second pivot axis parallel to said horizontal direction by second pivots, said upper auxiliary horizontal fin is on an upper wall surface, and
- a lower auxiliary horizontal fin axially supported so as to be turnable about a third pivot axis parallel to said horizontal direction by third pivots, said lower auxiliary horizontal fin is on a lower wall surface,
- wherein said second pivots of said upper auxiliary horizontal fin are at said upstream-side of said upper auxiliary horizontal fin,
- said third pivots of said lower auxiliary horizontal fin are at said upstream-side of said lower auxiliary horizontal fin,
- said second pivots of said upper auxiliary horizontal fin are on said upstream-side of said third pivots of said lower auxiliary horizontal fin,
- said second pivots of said upper auxiliary horizontal fin, said third pivots of said lower auxiliary horizontal fin, and said first pivots of said central horizontal fin are arranged in order from the upstream-side to the downstream-side, and
- when said central horizontal fin is turned to the downside, said lower auxiliary horizontal fin sticks out the downstream-side end portion toward the passage side.

* * * * *

UNITED STATES PATENT AND TRADEMARK OFFICE
CERTIFICATE OF CORRECTION

Page 1 of 1

PATENT NO. : 9,989,275 B2
APPLICATION NO. : 14/356235
DATED : June 5, 2018
INVENTOR(S) : Hiroyuki Oe et al.

It is certified that error appears in the above-identified patent and that said Letters Patent is hereby corrected as shown below:

On the Title Page

Item (73) include:
--- TOYOTA JIDOSHA KABUSHIKI KAISHA, Toyota-shi, Aichi (JP) ---

Signed and Sealed this
Fifth Day of February, 2019

Andrei Iancu
*Director of the United States Patent and Trademark Office*